US012591801B2

(12) United States Patent
Fujisaki

(10) Patent No.: US 12,591,801 B2
(45) Date of Patent: Mar. 31, 2026

(54) NON-TRANSITORY COMPUTER-READABLE RECORDING MEDIUM STORING SIMULATION PROGRAM, SIMULATION METHOD, AND INFORMATION PROCESSING DEVICE

(71) Applicant: FUJITSU LIMITED, Kawasaki (JP)

(72) Inventor: Jun Fujisaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/654,075

(22) Filed: May 3, 2024

(65) Prior Publication Data

US 2024/0303527 A1      Sep. 12, 2024

Related U.S. Application Data

(63) Continuation of application No. PCT/JP2021/042807, filed on Nov. 22, 2021.

(51) Int. Cl.
G06N 10/70 (2022.01)
G06N 10/40 (2022.01)

(52) U.S. Cl.
CPC ............. G06N 10/70 (2022.01); G06N 10/40 (2022.01)

(58) Field of Classification Search
CPC ......... G06N 10/70; G06N 10/40; G06N 10/80
See application file for complete search history.

(56) References Cited

U.S. PATENT DOCUMENTS 11,568,298 B2 * 1/2023 Gidney ................. G06F 7/4824
2021/0019223 A1 1/2021 Chamberland et al.

(Continued)

FOREIGN PATENT DOCUMENTS

JP      2014-241484      12/2014
JP      2020-535690      12/2020
WO      2019/054990 A1   3/2019

OTHER PUBLICATIONS

Krinnersebastianetal:"Realizingrepeatedquantumerrorcorrectionina distance-threesurfacecode",vol. 605,No. 7911, Nov. 15, 2021(Nov. 15, 2021),pp. 669-674,XP093233827.*

(Continued)

*Primary Examiner* — Albert Decady
*Assistant Examiner* — Osman M Alshack
(74) *Attorney, Agent, or Firm* — Fujitsu Intellectual Property Center

(57) ABSTRACT

An information processing device configured to execute processing including: generating qubit information indicating a two-dimensional lattice in which data qubits and auxiliary qubits are alternately arranged in a row and column direction; setting, for the qubit information, error information indicating error occurrence in a first data qubit among the data qubits; setting, for the qubit information, error detection information by inverting, from an initial value, a state of an auxiliary qubit adjacent to the first data qubit in the row or column direction; setting, for the qubit information, error correction information indicating a second data qubit to be corrected by a surface code using the error detection information; and determining presence or absence of occurrence of a logical error, based on a number of data qubits each of which corresponds to any one of the first or second data qubit in one row or one column in the two-dimensional lattice.

7 Claims, 28 Drawing Sheets

(56)    References Cited

U.S. PATENT DOCUMENTS

| | | | | |
|---|---|---|---|---|
| 2021/0035007 A1* | 2/2021 | Martinis | ................. | G06F 15/80 |
| 2021/0124640 A1* | 4/2021 | Nickerson | ............... | G06F 11/10 |
| 2021/0126652 A1* | 4/2021 | Delfosse | ............. | H03M 13/136 |
| 2022/0028927 A1* | 1/2022 | Lauer | .................... | G06N 10/40 |
| 2024/0086756 A1* | 3/2024 | Fujisaki | ................. | G06N 10/70 |

OTHER PUBLICATIONS

WIPO—International Search Report with English language translation and Written Opinion mailed on Feb. 8, 2022 for International Application No. PCT/JP2021/042807.

Y. Suzuki et al., "Efficient Simulation of Quantum Error Correction Under Coherent Error Based on the Nonunitary Free-Fermionic Formalism", Physical Review Letters, vol. 119, Issue 19, American Physical Society, pp. 190503-1-190503-5, Nov. 10, 2017. Cited in ISR.

C. Huang et al., "Alibaba Cloud Quantum Development Platform: Surface Code Simulations with Crosstalk", arXiv:2002.08918v1 [quant-ph], [online], pp. 1-23, Feb. 21, 2020, [retrieved on Jan. 27, 2022], Internet: <URL: https://arxiv.org/pdf/2002.08918.pdf>. Cited in ISR.

IBM—IBM Unveils Breakthrough 127-Qubit Quantum Processor, Nov. 16, 2021, https://newsroom.ibm.com/2021-11-16-IBM-Unveils-Breakthrough-127-Qubit-Quantum-Processor.

Krinner Sebastian et al., "Realizing Repeated Quantum Error Correction in a Distance-Three Surface Code", Nature, [Online] vol. 605, No. 7911, Nov. 15, 2021 (Nov. 15, 2021), pp. 669-674, XP093233827. Cited in EESR dated Jan. 2, 2025 for corresponding European Patent Application No. 21964844.1.

Roffe Joschka, "Quantum Error Correction: An Introductory Guide", Contemporary Physics., [Online] vol. 60, No. 3, Jul. 3, 2019 (Jul. 3, 2019), pp. 226-245, XP093233822. Cited in EESR dated Jan. 2, 2025 for corresponding European Patent Application No. 21964844.1.

EESR—The Extended European Search Report dated Jan. 2, 2025 for corresponding European Patent Application No. 21964844.1 [10 pages]. ** Non-Patent Literature by Huang cited in the EESR was previously submitted in the IDS filed on May 3, 2024.

EPOA—Office Action of European Patent Application No. 21964844.1 dated Dec. 16, 2025. ** Non-patent literature by Krinner et al., discussed in the EPOA was previously submitted in the IDS filed on Jan. 7, 2025.

* cited by examiner

・ $|\Psi\rangle = \alpha|0\rangle + \beta|1\rangle$ ($\alpha$ AND $\beta$ ARE COMPLEX NUMBERS, $|0\rangle = \begin{pmatrix} 1 \\ 0 \end{pmatrix}$, $|1\rangle = \begin{pmatrix} 0 \\ 1 \end{pmatrix}$)

☐   : DATA QUBIT

┌╌┐
└╌┘   : AUXILIARY QUBIT (FOR X ERROR DETECTION)

┆ ╌ ┆   : AUXILIARY QUBIT (FOR Z ERROR DETECTION)

FIG. 14
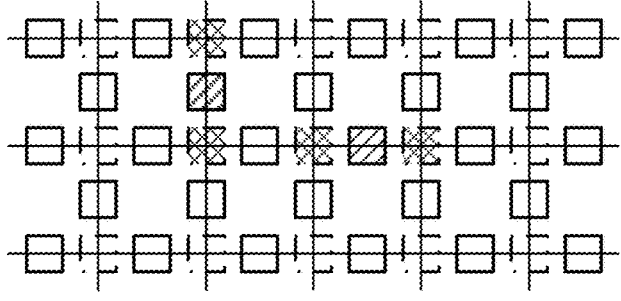
[FIRST ERROR OCCURRENCE PATTERN]
61
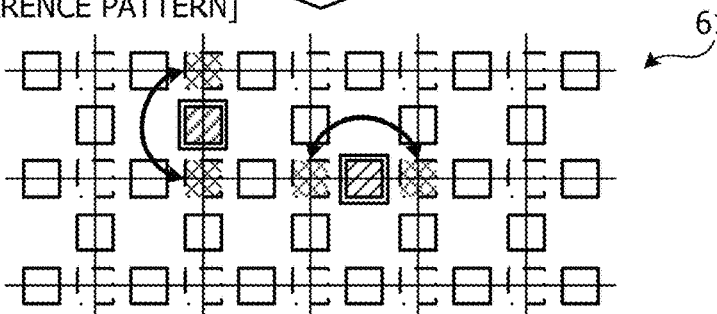
[SECOND ERROR OCCURRENCE PATTERN]
62
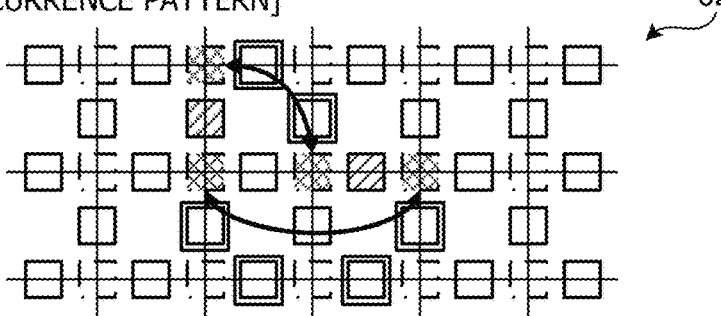
[THIRD ERROR OCCURRENCE PATTERN]
63
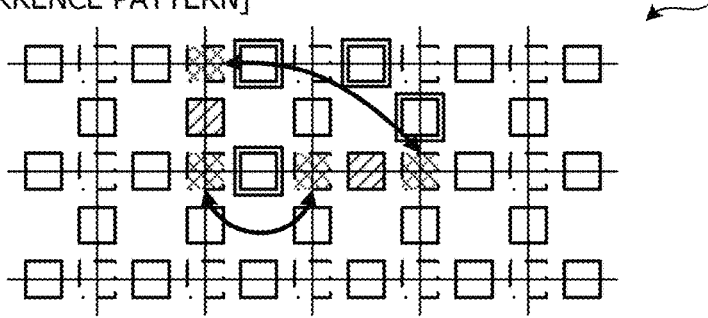
: DATA QUBIT IN WHICH ERROR HAS OCCURRED
: INVERTED AUXILIARY QUBIT
(MEASUREMENT INFORMATION IS -1)
: DATA QUBIT SPECIFIED AS ERROR

FIG. 16
[COMPLETELY MATCH]
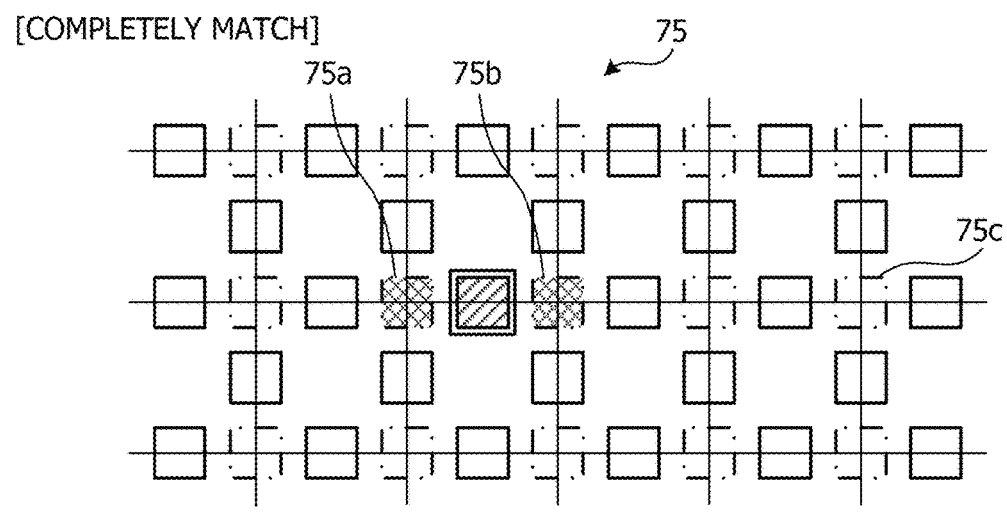
[LOOP IS FORMED]
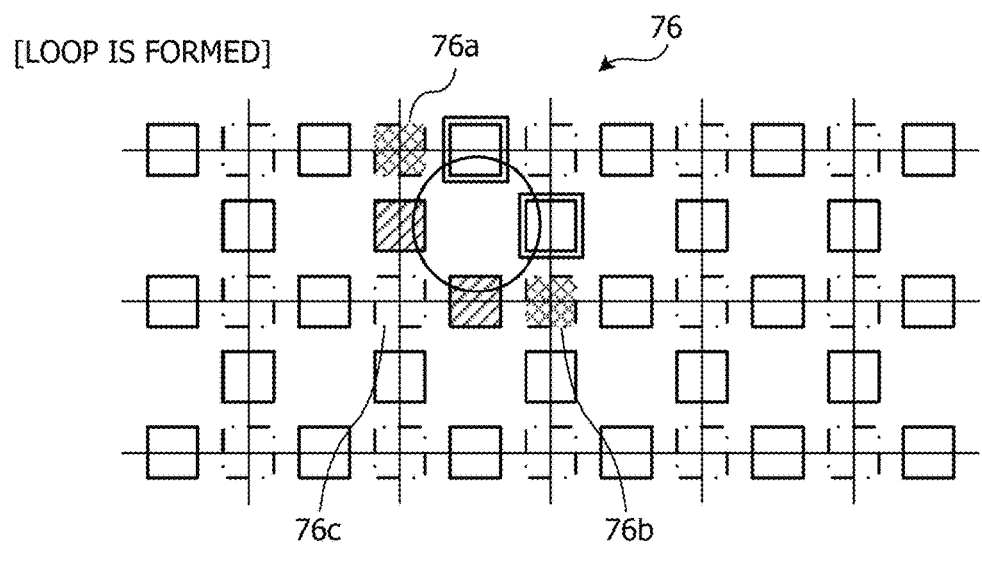
[LOOP IS FORMED]
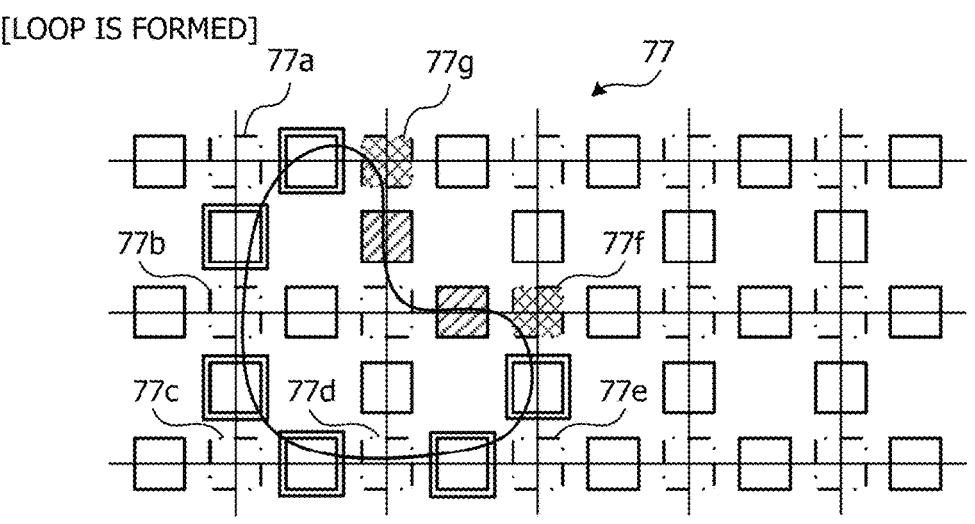

ERROR CORRECTION

ERROR CHAIN IS COUPLED TO OPPOSITE SIDE ⇒ LOGICAL ERROR

Figure 20:
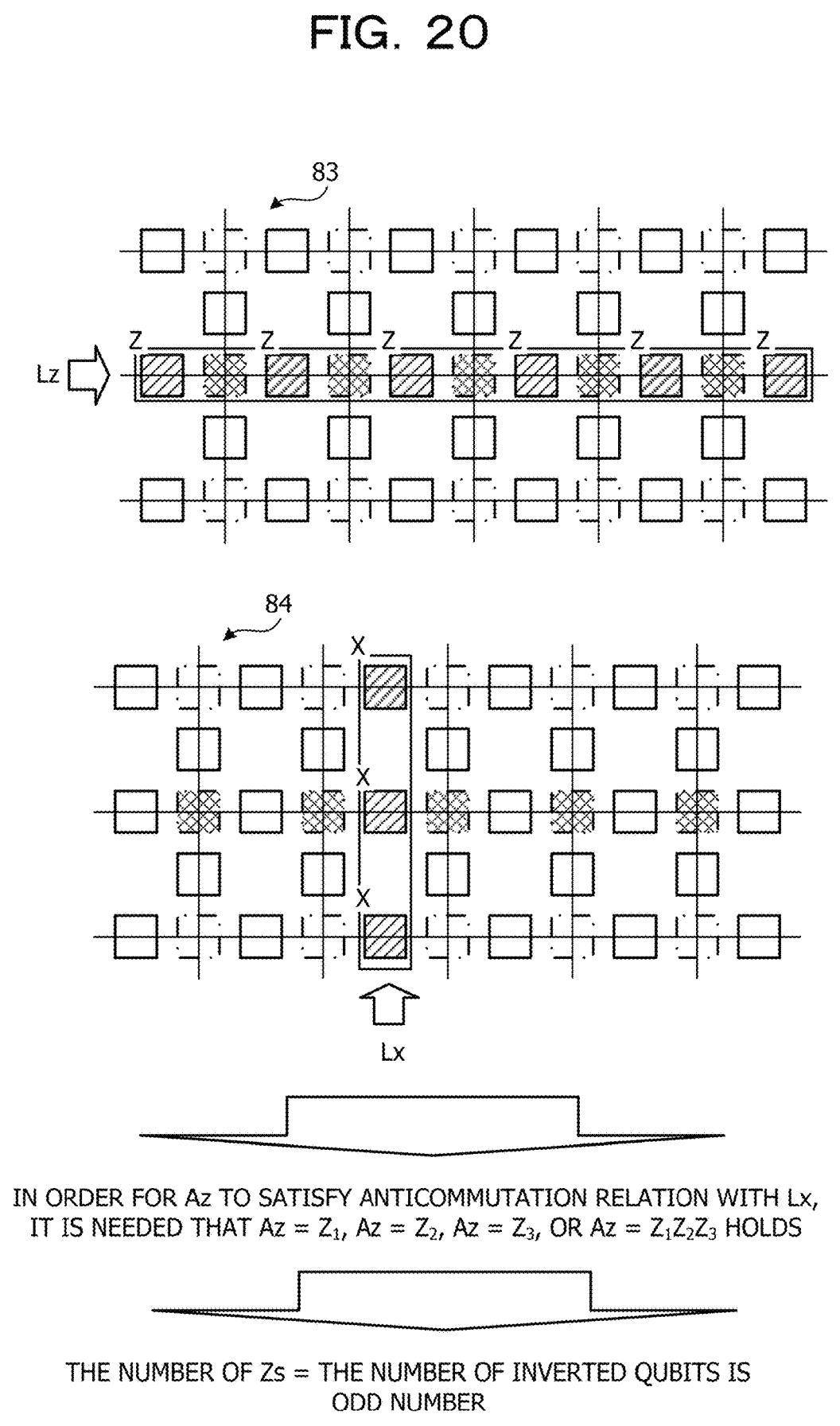

IN ORDER FOR Az TO SATISFY ANTICOMMUTATION RELATION WITH Lx,
IT IS NEEDED THAT Az = $Z_1$, Az = $Z_2$, Az = $Z_3$, OR Az = $Z_1Z_2Z_3$ HOLDS

THE NUMBER OF Zs = THE NUMBER OF INVERTED QUBITS IS
ODD NUMBER

Figure 24:
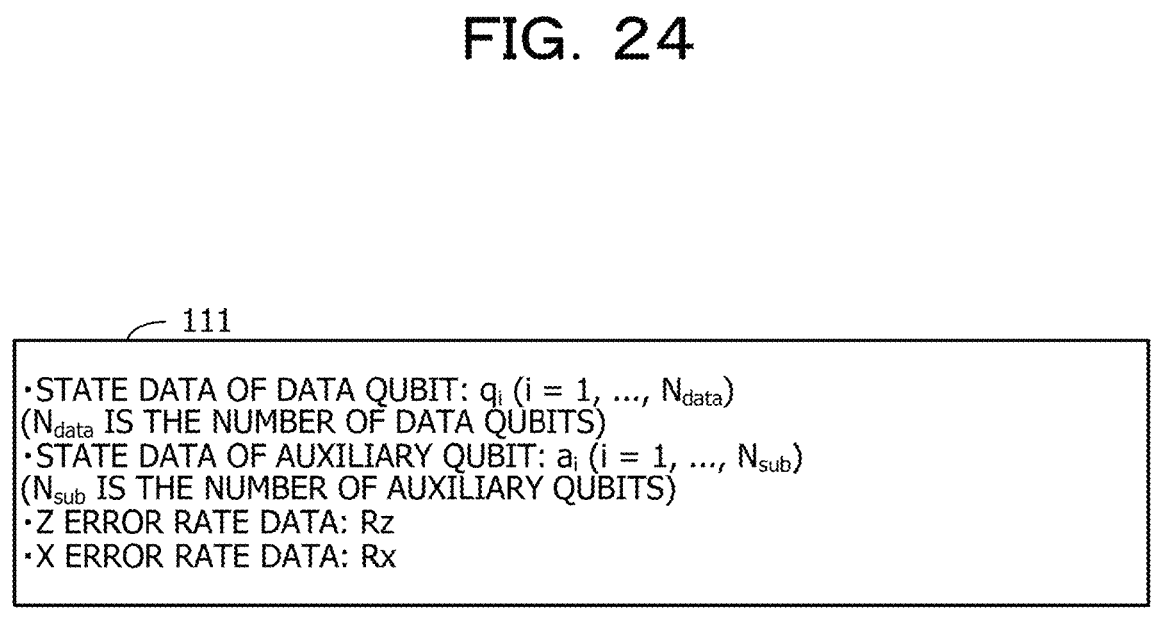

- STATE DATA OF DATA QUBIT: $q_i$ ($i = 1, ..., N_{data}$)
($N_{data}$ IS THE NUMBER OF DATA QUBITS)
- STATE DATA OF AUXILIARY QUBIT: $a_i$ ($i = 1, ..., N_{sub}$)
($N_{sub}$ IS THE NUMBER OF AUXILIARY QUBITS)
- Z ERROR RATE DATA: Rz
- X ERROR RATE DATA: Rx

FIG. 27

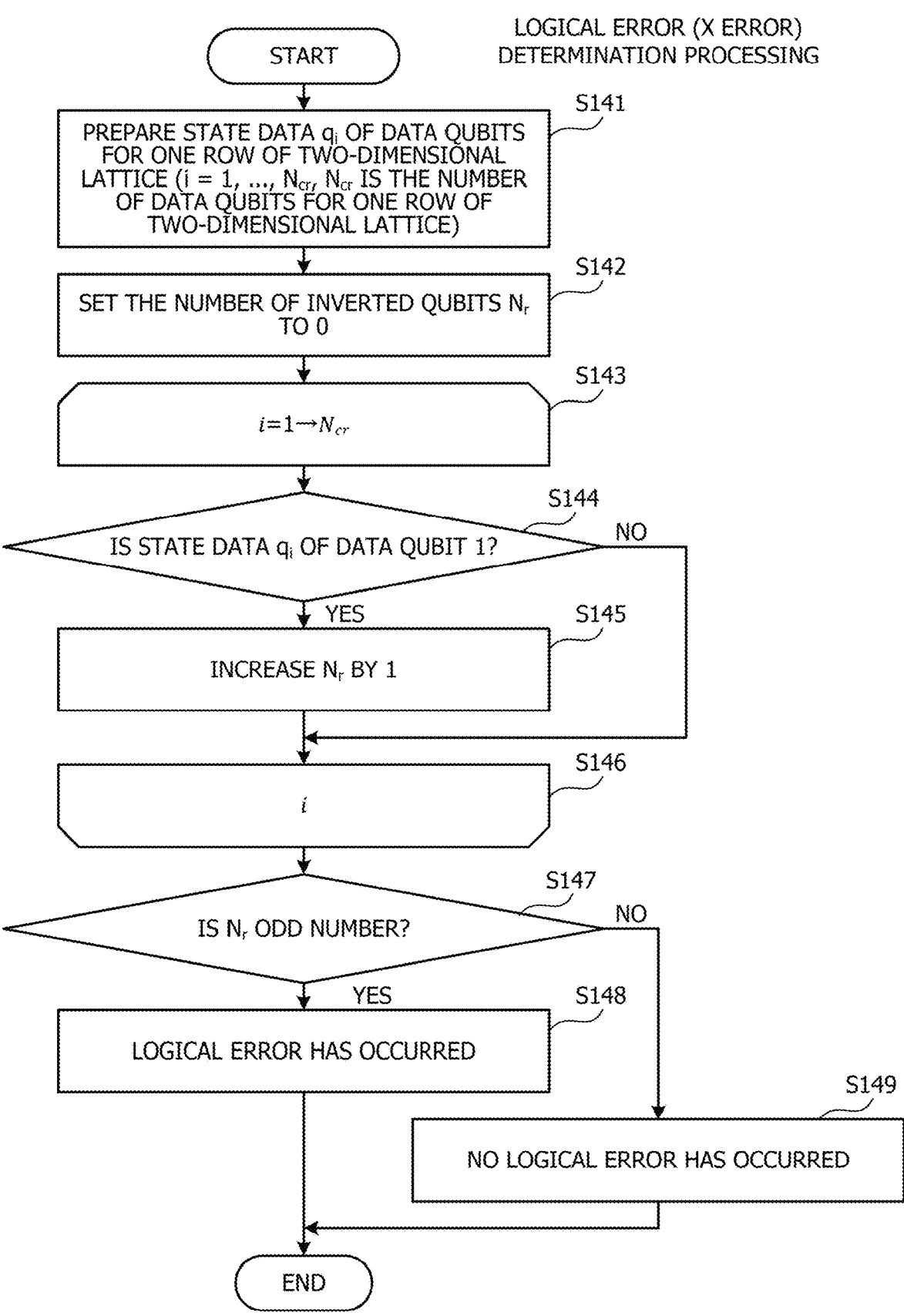

LOGICAL ERROR (X ERROR)
DETERMINATION PROCESSING

START

S141

PREPARE STATE DATA $q_i$ OF DATA QUBITS FOR ONE ROW OF TWO-DIMENSIONAL LATTICE ($i = 1, ..., N_{cr}$, $N_{cr}$ IS THE NUMBER OF DATA QUBITS FOR ONE ROW OF TWO-DIMENSIONAL LATTICE)

S142

SET THE NUMBER OF INVERTED QUBITS $N_r$ TO 0

S143

$i = 1 \rightarrow N_{cr}$

S144

IS STATE DATA $q_i$ OF DATA QUBIT 1?    NO

YES    S145

INCREASE $N_r$ BY 1

S146

$i$

S147

IS $N_r$ ODD NUMBER?    NO

YES    S148

LOGICAL ERROR HAS OCCURRED

S149

NO LOGICAL ERROR HAS OCCURRED

END

91:POLYGONAL LINE (LOGICAL ERROR DETERMINATION BY SEARCH OF
   ERROR CHAIN)

92:APPROXIMATE CURVE (LOGICAL ERROR DETERMINATION BY SEARCH OF
   ERROR CHAIN)

93:POLYGONAL LINE (LOGICAL ERROR DETERMINATION BY THE NUMBER OF
   INVERTED QUBITS OF ONE COLUMN (OR ONE ROW))

NON-TRANSITORY COMPUTER-READABLE RECORDING MEDIUM STORING SIMULATION PROGRAM, SIMULATION METHOD, AND INFORMATION PROCESSING DEVICE

CROSS-REFERENCE TO RELATED APPLICATION

This application is a continuation application of International Application PCT/JP2021/042807 filed on Nov. 22, 2021 and designated the U.S., the entire contents of which are incorporated herein by reference.

FIELD

The present disclosure relates to a non-transitory computer-readable recording medium storing a simulation program, a simulation method, and an information processing device.

BACKGROUND

A calculation by a quantum computer is implemented by performing initialization, a gate operation, and measurement processing for a plurality of qubits. In the quantum computer, an error (physical error) occurs in a qubit due to environmental noise or the like in a process of such operations for the qubits. Therefore, in the quantum computer, redundancy of the qubits is performed similarly to a conventional computer (also referred to as a classical computer) in order to specify an error qubit and error content.

A surface code is one of methods of specifying the error qubit and the error content using the redundant qubits. In the surface code, data qubits and auxiliary qubits are alternately arranged in a two-dimensional lattice pattern. A state of a data qubit among the plurality of qubits (data qubits and auxiliary qubits) arranged in the lattice pattern is coded into one logical qubit. The auxiliary qubits are used for either X error detection or Z error detection for each column. In a case where the surface code is performed, the quantum computer first appropriately initializes a logical quantum state, performs a gate operation between one auxiliary qubit and four surrounding data qubits when error detection is performed, and performs measurement of the auxiliary qubits. The quantum computer detects an X error or a Z error based on a value of the auxiliary qubit. Then, the quantum computer performs a gate operation of error correction processing for the qubits using information indicating a type of the error and position information of the data qubit specified as the error portion.

As a technology related to error correction in the quantum computer, for example, a quantum error correction method that does not depend on a system size has been proposed. Furthermore, methods of determining and correcting errors in an array of qubits executing a quantum algorithm has also been proposed. Moreover, a technology of correcting fault-tolerantly quantum errors in one or more of a plurality of physical qubits based on a measurement value from at least one flag qubit has also been proposed.

Examples of the related art include: [Patent Document 1] Japanese Laid-open Patent Publication No. 2014-241484; [Patent Document 2] Japanese National Publication of International Patent Application No. 2020-535690; and [Patent Document 3] U.S. Patent Application Publication No. 2021/0019223.

SUMMARY

According to an aspect of the embodiments, there is provided a non-transitory computer-readable recording medium storing a simulation program for causing a computer to execute processing including: generating qubit information that indicates a two-dimensional lattice in which a plurality of data qubits and a plurality of auxiliary qubits are alternately arranged in each of a row direction and a column direction; setting, for the qubit information, error information that indicates error occurrence in a first data qubit among the plurality of data qubits; setting, for the qubit information, error detection information obtained by inverting, from an initial value, a state of an auxiliary qubit adjacent to the first data qubit in the row direction or the column direction; setting, for the qubit information, error correction information that indicates a second data qubit to be subjected to error correction by a surface code based on the error detection information; and determining presence or absence of occurrence of a logical error, based on a data qubit number corresponding to a number obtained by counting data qubits each of which corresponds to any one of the first data qubit or the second data qubit, each of the first data qubit or the second data qubit being a data qubit in one row or one column in the two-dimensional lattice.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating an example of a case where it is not possible to uniquely specify an error occurrence portion.

FIG. 16 is a diagram illustrating an example of an error correction success pattern.

FIG. 20 is a diagram for describing that a logical error occurs in a case where the number of inverted qubits in vertical one column is an odd number.

FIG. 24 is a diagram illustrating an example of a simulation condition.

FIG. 27 is a flowchart illustrating an example of a procedure of logical error (X error) determination processing.

DESCRIPTION OF EMBODIMENTS

When an error occurs in two or more qubits among a plurality of qubits constituting one logical qubit, error correction may fail even when a surface code is used. Such a failure in the error correction is referred to as a logical error.

In the surface code, a logical error occurrence rate changes according to the number of qubits in a lattice representing one logical qubit. The logical error occurrence rate also changes according to an occurrence rate of an error of a qubit due to environmental noise or the like. Therefore, in order to evaluate performance of quantum error correction by the surface code, it is considered to perform simulation of error correction by the surface code using a classical computer (also referred to as a von Neumann computer). In an actual machine of the quantum computer, it is not possible to determine whether the logical error occurs unless a data qubit itself is measured. However, in the simulation, a portion where the error occurs may be known in advance. Therefore, by performing the simulation of the error correction using the surface code under a predetermined condition, it is possible to determine presence or absence of occurrence of the logical error under the condition. As a result, it is possible to examine an appropriate number of qubits per logical qubit in a case where the surface code is applied to the quantum computer, or the like.

However, in the conventional determination processing of the presence or absence of the occurrence of the logical error in the error correction simulation using the surface code, a calculation amount exponentially increases as the number of qubits per logical qubit increases. Therefore, it is difficult to perform the error correction simulation using the surface code for a large-scale quantum computer.

In one aspect, an object of the present case is to enable efficient determination of presence or absence of occurrence of a logical error.

Hereinafter, the present embodiments will be described with reference to the drawings. Note that each of the embodiments may be implemented in combination with a plurality of embodiments as long as no contradiction arises.

First Embodiment

A first embodiment is a simulation method of efficiently determining presence or absence of occurrence of a logical error in a case where simulation of error correction processing is executed using a surface code for an error of a qubit generated in a quantum computer.

Figure 1:
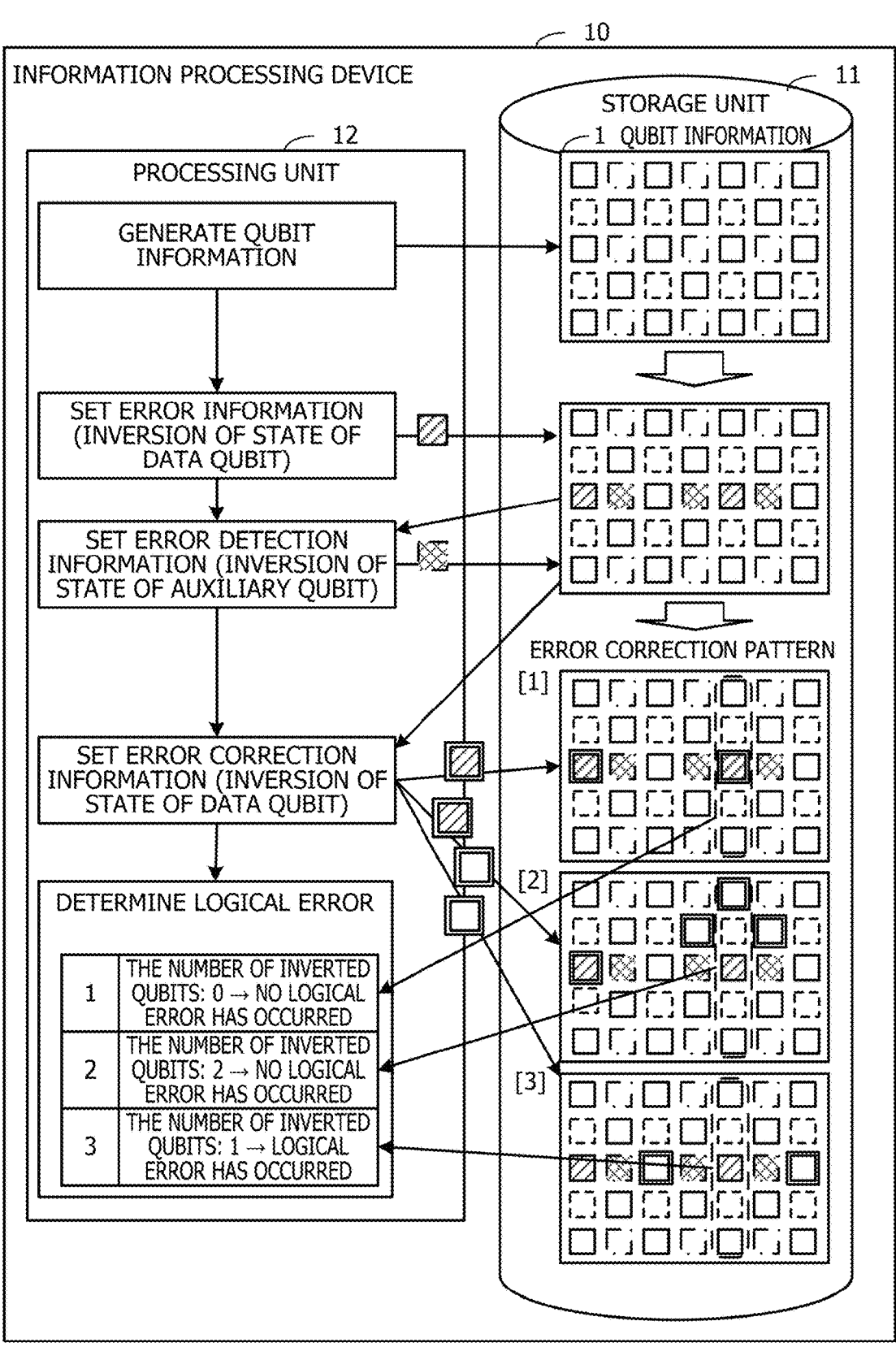
FIG. 1 is a diagram illustrating an example of a simulation method according to a first embodiment.

FIG. 1 is a diagram illustrating an example of the simulation method according to the first embodiment. In FIG. 1, an information processing device 10 used to perform the simulation method is illustrated. The information processing device 10 may perform the simulation method by executing a simulation program, for example.

The information processing device 10 includes a storage unit 11 and a processing unit 12. The storage unit 11 is, for example, a memory or a storage device included in the information processing device 10. The processing unit 12 is, for example, a processor or an arithmetic circuit included in the information processing device 10.

The storage unit 11 stores qubit information 1 indicating a two-dimensional lattice in which a plurality of data qubits and a plurality of auxiliary qubits are alternately arranged in each of a row direction and a column direction. In the two-dimensional lattice, qubits are arranged at equal intervals in a rectangular region, and the qubits arranged along four sides of the rectangle are boundaries of the two-dimensional lattice. In the two-dimensional lattice indicated by the qubit information 1, for example, a column in which auxiliary qubits for phase inversion error (Z error) detection are arranged and a column in which auxiliary qubits for bit inversion error (X error) detection are arranged are alternately provided. In such a two-dimensional lattice indicated by the qubit information 1, a row in which auxiliary qubits for phase inversion error detection are arranged and a row in which auxiliary qubits for bit inversion error detection are arranged are also alternately provided.

The processing unit 12 receives an input of a simulation condition from a user, and generates the qubit information 1 according to the simulation condition. The simulation condition include, for example, a qubit number corresponding to the number of qubits in each of the row direction and the column direction of the two-dimensional lattice, an error occurrence rate in the data qubits, or the like. The processing unit 12 generates the qubit information 1 based on the simulation condition. Then, the processing unit 12 stores the generated qubit information 1 in the storage unit 11.

The processing unit 12 sets, for the qubit information 1, error information indicating error occurrence in a first data qubit among the plurality of data qubits. For example, the processing unit 12 randomly determines the first data qubit that generates an error from among the plurality of data qubits based on a predetermined error occurrence rate. The error generated in the first data qubit is an unintended inversion (bit inversion or phase inversion) of a state of the data qubit. In the example of FIG. 1, the first data qubit is indicated by hatching with a stripe pattern.

Next, the processing unit 12 sets, for the qubit information 1, error detection information obtained by inverting a state of an auxiliary qubit adjacent to the first data qubit in the row direction or the column direction from an initial value. At this time, the processing unit 12 inverts the state of the auxiliary qubit by the number of times of the number of adjacent first data qubits. Therefore, for example, a state of an auxiliary qubit adjacent to two first data qubits is inverted twice and returns to an initial state. In the example of FIG. 1, the auxiliary processing bit in the state of being inverted from the initial value is indicated by hatching with a check pattern.

Moreover, the processing unit 12 sets, for the qubit information 1, error correction information indicating a second data qubit to be subjected to error correction by the surface code based on the error detection information. The processing unit 12 obtains, based on, for example, arrangement of an auxiliary qubit whose state is inverted, a pattern of error occurrence of the data qubit such that the auxiliary qubit is inverted when error detection is performed. Then, the processing unit 12 sets the data qubit in which an error is assumed to occur in the pattern of error occurrence as the second data qubit to be subjected to error correction. In the example of FIG. 1, a rectangle of a data qubit to be subjected to error correction is represented by a double line.

Note that an arrangement pattern (error correction pattern) of the second data qubits may have a plurality of patterns. In the example of FIG. 1, three error correction patterns are illustrated.

The processing unit 12 determines presence or absence of occurrence of a logical error based on a data qubit number that indicates the number of one or more data qubits each of which corresponds to any one of the first or second data qubit in one row or one column in the two-dimensional lattice. For example, the processing unit 12 determines that a logical error occurs in a case where the number of data qubits (inverted qubits) corresponding to any one of the first data qubit and the second data qubit in one row or one column in the two-dimensional lattice is an odd number. Note that the data qubits corresponding to both the first data qubit and the second data qubit are data qubits in which an error has occurred but has been corrected correctly, and are not included in the inverted qubits.

For example, in the example illustrated in FIG. 1, presence or absence of a logical error is determined based on the number of inverted qubits in a fifth column. For example, in a first error correction pattern, the number of inverted qubits is "0" (even number), and it is determined that no logical error occurs. Furthermore, in a second error correction pattern, the number of inverted qubits is "2" (even number), and it is determined that no logical error occurs. In a third error correction pattern, the number of inverted qubits is "1" (odd number), and it is determined that a logical error occurs.

As described above, presence or absence of occurrence of a logical error may be determined by the number of inverted qubits in a certain one row or one column, and the presence or absence of the occurrence of the logical error may be efficiently determined when the simulation of the surface code is executed.

Note that, when a row in which auxiliary qubits for phase inversion error detection are arranged and a row in which a bit inversion error is arranged are alternately provided, there are a boundary (smooth boundary) in which the auxiliary qubits for phase inversion error detection are arranged and a boundary (rough boundary) in which the auxiliary qubits for bit inversion error detection are arranged at a boundary of four sides of the two-dimensional lattice. The processing unit 12 determines presence or absence of occurrence of a logical error caused by a phase inversion error based on the number of data qubits corresponding to any one of the first data qubit and the second data qubit in one row or one column in a direction parallel to the rough boundary. Furthermore, the processing unit 12 determines presence or absence of occurrence of a logical error caused by a bit inversion error based on the number of data qubits corresponding to any one of the first data qubit and the second data qubit in one row or one column in a direction parallel to the smooth boundary.

In this way, the presence or absence of the logical error caused by each of the phase inversion error and the bit inversion error may be individually determined.

Note that, in a case where an error is randomly generated from among the plurality of data qubits based on a predetermined error occurrence rate to determine the first data qubit, whether or not a logical error occurs is stochastically determined. Therefore, the processing unit 12 may repeatedly execute the setting of the error information, the setting of the error detection information, the setting of the error correction information, and the determination of the presence or absence of the occurrence of the logical error a predetermined number of times. In this case, for example, the processing unit 12 calculates a logical error occurrence rate based on a result of determining the presence or absence of the occurrence of the logical error the predetermined number of times. As a result, the logical error occurrence rate according to the error occurrence rate of the data qubit is obtained.

Second Embodiment

Next, a second embodiment will be described. A second embodiment is a computer that executes a simulation of error correction using a surface code (hereinafter, referred to as surface code simulation) for an error that randomly occurs in a quantum computer, and efficiently determines presence or absence of occurrence of a logical error.

Figure 2:
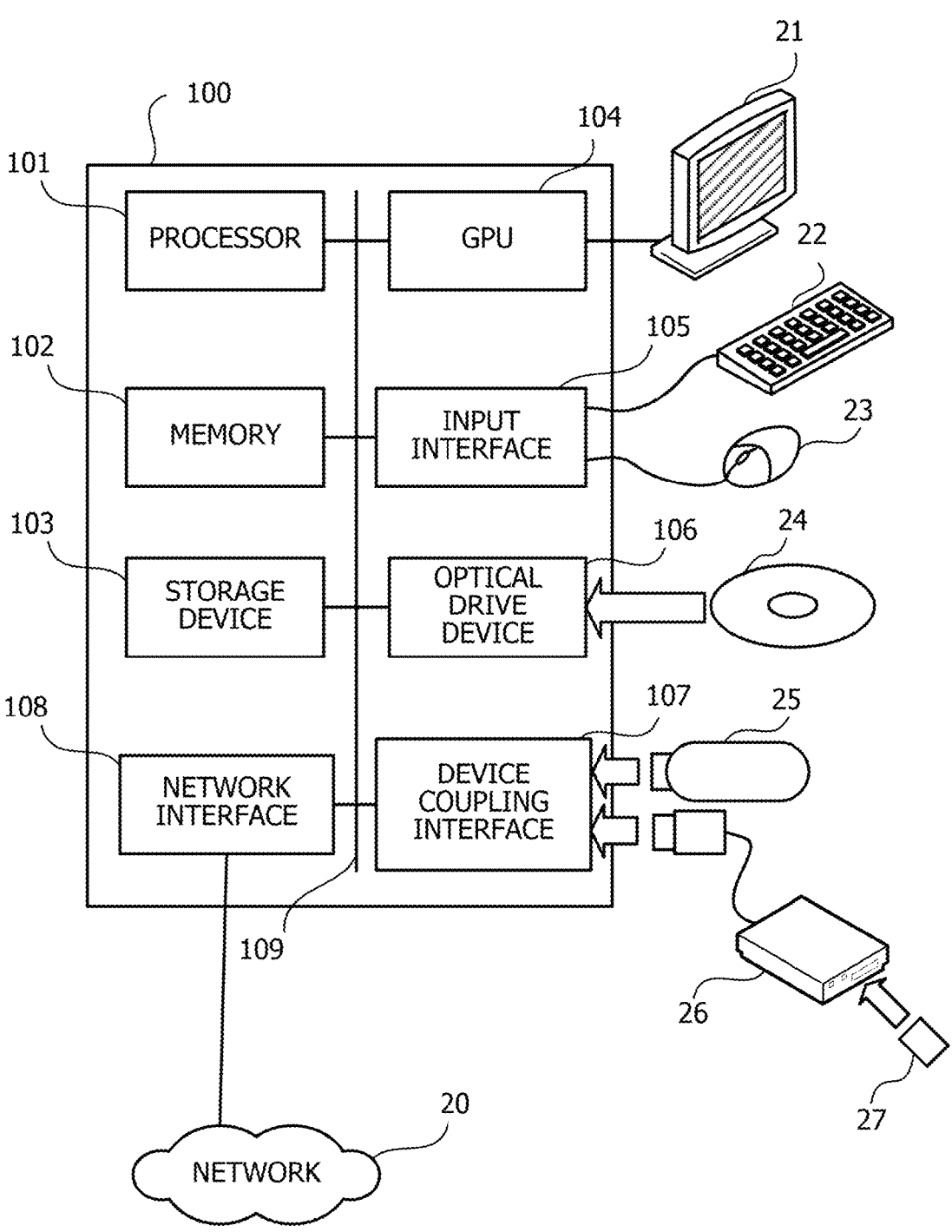
FIG. 2 is a diagram illustrating an example of hardware of a computer for surface code simulation.

FIG. 2 is a diagram illustrating an example of hardware of a computer for the surface code simulation. An entire device of a computer 100 is controlled by a processor 101. A memory 102 and a plurality of peripheral devices are coupled to the processor 101 via a bus 109. The processor 101 may be a multiprocessor. The processor 101 is, for example, a central processing unit (CPU), a micro processing unit (MPU), or a digital signal processor (DSP). At least a part of functions implemented by execution of a program by the processor 101 may be implemented by an electronic circuit such as an application specific integrated circuit (ASIC) or a programmable logic device (PLD).

The memory 102 is used as a main storage device of the computer 100. In the memory 102, temporarily stores at least a part of operating system (OS) programs and application programs to be executed by the processor 101. Furthermore, the memory 102 stores various types of data to be used in processing by the processor 101. As the memory 102, for example, a volatile semiconductor storage device such as a random access memory (RAM) is used.

Examples of the peripheral devices coupled to the bus 109 include a storage device 103, a graphics processing unit (GPU) 104, an input interface 105, an optical drive device 106, a device coupling interface 107, and a network interface 108.

The storage device 103 electrically or magnetically writes and reads data to and from a built-in recording medium. The storage device 103 is used as an auxiliary storage device of the computer 100. The storage device 103 stores OS programs, application programs, and various types of data. Note that, as the storage device 103, for example, a hard disk drive (HDD) or a solid state drive (SSD) may be used.

The GPU 104 is an arithmetic unit that performs image processing, and is also referred to as a graphic controller. A monitor 21 is coupled to the GPU 104. The GPU 104 causes a screen of the monitor 21 to display an image according to an instruction from the processor 101. Examples of the monitor 21 include a display device using organic electro luminescence (EL), a liquid crystal display device, and the like.

A keyboard 22 and a mouse 23 are coupled to the input interface 105. The input interface 105 transmits signals sent from the keyboard 22 and the mouse 23 to the processor 101. Note that the mouse 23 is an example of a pointing device, and another pointing device may also be used. Examples of the another pointing device include a touch panel, a tablet, a touch pad, a track ball, and the like.

The optical drive device 106 uses laser light or the like to read data recorded in an optical disk 24 or write data to the optical disk 24. The optical disk 24 is a portable recording medium in which data is recorded in a readable manner by reflection of light. Examples of the optical disk 24 include a digital versatile disc (DVD), a DVD-RAM, a compact disc read only memory (CD-ROM), a CD-recordable (R)/rewritable (RW), and the like.

The device coupling interface 107 is a communication interface for coupling the peripheral devices to the computer 100. For example, a memory device 25 and a memory reader/writer 26 may be coupled to the device coupling interface 107. The memory device 25 is a recording medium equipped with a communication function with the device coupling interface 107. The memory reader/writer 26 is a device that writes data to a memory card 27 or reads data from the memory card 27. The memory card 27 is a card-type recording medium.

The network interface 108 is coupled to a network 20. The network interface 108 exchanges data with another computer or a communication device via the network 20. The network interface 108 is, for example, a wired communication interface coupled to a wired communication device such as a switch or a router with a cable. Furthermore, the network interface 108 may be a wireless communication interface that is coupled to and communicates with a wireless communication device such as a base station or an access point with radio waves.

The computer 100 may implement processing functions of the second embodiment with the hardware as described above. Note that the information processing device 10 described in the first embodiment may also be implemented by hardware similar to that of the computer 100 illustrated in FIG. 2.

The computer 100 implements the processing functions of the second embodiment by executing, for example, a program recorded in a computer-readable recording medium. The program in which processing content to be executed by the computer 100 is described may be recorded in various recording media. For example, the program to be executed by the computer 100 may be stored in the storage device 103. The processor 101 loads at least a part of the program in the storage device 103 into the memory 102, and executes the program. Furthermore, the program to be executed by the computer 100 may also be recorded in a portable recording medium such as the optical disk 24, the memory device 25, or the memory card 27. The program stored in the portable recording medium may be executed after being installed in the storage device 103 under the control of the processor 101, for example. Furthermore, the processor 101 may also read the program directly from the portable recording medium and execute the program.

Hereinafter, before description of the surface code simulation, error correction by the surface code in a quantum computer and a cause of occurrence of a logical error will be described with reference to FIGS. 3 to 17.

Figure 3:
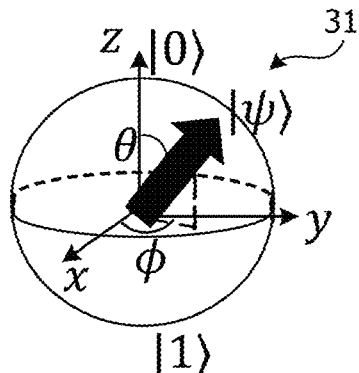
FIG. 3 is a diagram for describing a qubit.

FIG. 3 is a diagram for describing a qubit. The qubit is a minimum unit of quantum information corresponding to a minimum unit "bit" (classical bit) of an information amount in a conventional computer. The qubit takes a quantum mechanical superposition state (quantum state) of "0" and "1". The quantum state of the qubit is mathematically represented by a two-dimensional vector as indicated in the following Expression (1), and |0> and | 1> correspond to states of "0" and "1" of the classical bit, respectively.

[Expression 1]

$$|\psi\rangle = \alpha|0\rangle + \beta|1\rangle \ (\alpha \text{ and } \beta \text{ are complex numbers}, |0\rangle = \begin{pmatrix} 1 \\ 0 \end{pmatrix}, |1\rangle = \begin{pmatrix} 0 \\ 1 \end{pmatrix}) \quad (1)$$

When $\alpha$ and $\beta$ are rewritten as in Expression (2) using real numbers $\varphi$ and $\theta$ and an imaginary unit i, the qubit is expressed by a Bloch sphere 31 illustrated in FIG. 3.

[Expression 2]

$$\alpha = \cos\left(\frac{\theta}{2}\right), \beta = e^{i\phi}\sin\left(\frac{\theta}{2}\right) \quad (2)$$

In the classical bit, only the state of "0" or "1" may be taken, whereas the qubit may take an optional state in a surface of the Bloch sphere 31. In a quantum computer based on a quantum gate system, by performing a gate operation on the qubit, a calculation according to a purpose may be advanced.

The gate operation is an operation of changing the quantum state, and is mathematically expressed as causing a matrix operator to act on the vector of the quantum state. Examples of the gate operation includes an X gate that performs bit inversion of a qubit. An operation by the X gate is represented by a mathematical expression as follows.

[Expression 3]

$$\text{Matrix operator } \begin{pmatrix} 0 & 1 \\ 1 & 0 \end{pmatrix} \text{ corresponding to} \quad (3)$$

bit inversion operation (|0 > → |1 >) of one qubit $$|0\rangle = \begin{pmatrix} 1 \\ 0 \end{pmatrix} \rightarrow \begin{pmatrix} 0 & 1 \\ 1 & 0 \end{pmatrix} \begin{pmatrix} 1 \\ 0 \end{pmatrix} = \begin{pmatrix} 0 \\ 1 \end{pmatrix} = |1\rangle$$

Furthermore, an operation by a Z gate that performs phase inversion of a qubit is represented by a mathematical expression as follows.

[Expression 4]

$$\text{Matrix operator } \begin{pmatrix} 1 & 0 \\ 0 & -1 \end{pmatrix} \text{ corresponding to} \quad (4)$$

-continued phase inversion operation ($|+\rangle \to |-\rangle$) of one qubit $$|+\rangle = \frac{1}{\sqrt{2}}\begin{pmatrix}1\\1\end{pmatrix} \to \begin{pmatrix}1 & 0\\0 & -1\end{pmatrix}\frac{1}{\sqrt{2}}\begin{pmatrix}1\\1\end{pmatrix} = \frac{1}{\sqrt{2}}\begin{pmatrix}1\\-1\end{pmatrix} = |-\rangle$$

$$\left(|+\rangle \equiv \frac{1}{\sqrt{2}}\left(|0\rangle + |1\rangle\right)\right), \left(|-\rangle \equiv \frac{1}{\sqrt{2}}\left(|0\rangle - |1\rangle\right)\right)$$

A matrix operator corresponding to each of the X gate operation and the Z gate operation is known as a Pauli operator. Examples of the Pauli operator include the following three matrix operators.

[Expression 5]

$$\text{Pauli operator: } X = \begin{pmatrix}0 & 1\\1 & 0\end{pmatrix}, Y = \begin{pmatrix}0 & -i\\i & 0\end{pmatrix}, Z = \begin{pmatrix}1 & 0\\0 & -1\end{pmatrix} \quad (5)$$

A product of the Pauli operator has a property of ($XY=-YX$, $YZ=-ZY$, and $ZX=-XZ$). Satisfaction of such a relationship is referred to as satisfaction of an anticommutation relation. Furthermore, satisfaction of a relationship without a minus sign (for example, a relationship $XI=IX$ with an identity operator I) is referred to as satisfaction of a commutation relation.

Other examples of the operator used for the gate operation include an Hadamard operator. The Hadamard operator is used for a gate operation of creating a superposition state for $|0\rangle$ and $|1\rangle$. The Hadamard operator is represented by the following Expression (6).

[Expression 6]

Convert one−qubit state between $|0\rangle \Leftrightarrow |+\rangle$ and $|1\rangle \Leftrightarrow |-\rangle$ (6)

$$H = \frac{1}{\sqrt{2}}\begin{pmatrix}1 & 1\\1 & -1\end{pmatrix}$$

The above matrix operators are matrix operators that act on one qubit. There are also operators acting on two qubits.

A two-qubit state is represented as a tensor product "$|a\rangle \times |b\rangle$" (tensor product x is a symbol of x in a circle) of a one-qubit state, which is usually written as $|ab\rangle$, and is a 2×2 four-dimensional vector. Examples of the matrix operator acting on the two qubits include a CNOT operator.

When one qubit (control qubit) is 1, the CNOT operator performs bit inversion on the other qubit (target qubit) ($|10\rangle \to |11\rangle$). Since the two-qubit state is the four-dimensional vector, the corresponding matrix operator becomes 4×4 dimensional. The CNOT operator is represented by the following expression.

[Expression 7]

$$Cx = \begin{pmatrix}1 & 0 & 0 & 0\\0 & 1 & 0 & 0\\0 & 0 & 0 & 1\\0 & 0 & 1 & 0\end{pmatrix}, |10\rangle = \begin{pmatrix}0\\0\\1\\0\end{pmatrix} \to \begin{pmatrix}1 & 0 & 0 & 0\\0 & 1 & 0 & 0\\0 & 0 & 0 & 1\\0 & 0 & 1 & 0\end{pmatrix}\begin{pmatrix}0\\0\\1\\0\end{pmatrix} = \begin{pmatrix}0\\0\\0\\1\end{pmatrix} = |11\rangle \quad (7)$$

A quantum circuit is used to collectively express gate operations for a plurality of qubits. In the quantum circuit, a state transition of a qubit is represented by a line, and each gate operation is represented by a corresponding symbol.

Figure 4:
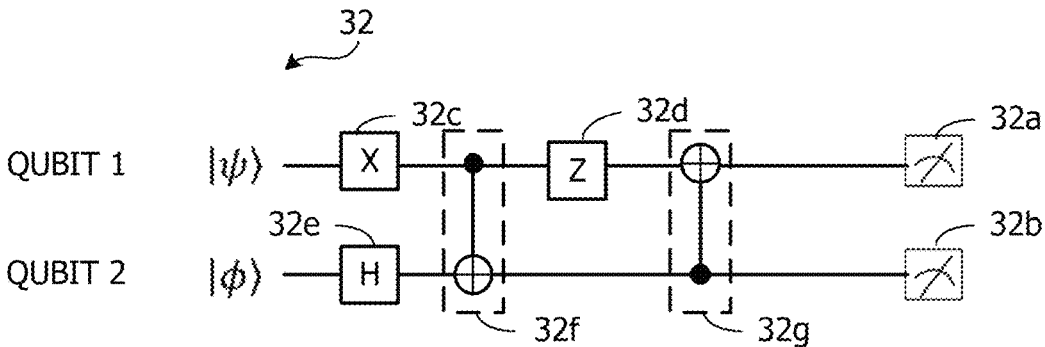
FIG. 4 is a diagram illustrating an example of a quantum circuit.

FIG. 4 is a diagram illustrating an example of the quantum circuit. Each horizontal line of a quantum circuit 32 corresponds to a qubit. An input to the qubit is indicated on a left side of the horizontal line. Symbols indicating gate operations for the corresponding qubit are arranged on each horizontal line in a horizontal direction (from left to right) in chronological order. Symbols 32*a* and 32*b* like meters on a right side of the horizontal line indicate measurement operations.

Among the gate operations indicated in the quantum circuit 32, for example, a symbol X 32*c* surrounded by a rectangle indicates a Pauli operator "X" (X gate operation). A symbol Z 32*d* surrounded by a rectangle indicates a Pauli operator "Z" (Z gate operation). A symbol H 32*e* surrounded by a rectangle indicates an Hadamard operator "H" (Hadamard gate operation).

A gate operation for two qubits is described across a plurality of horizontal lines. For example, symbols 32*f* and 32*g* indicating a gate operation corresponding to a CNOT operator Cx couple a white circle having+therein and a black circle with a line. The black circle is arranged on a horizontal line of a control qubit, and the white circle having+therein is arranged on a horizontal line of a target qubit.

For example, the quantum circuit 32 illustrated in FIG. 4 indicates that gate operations "$C_{x(2,1)}Z_{(1)}C_{x(1,2)}H_{(2)}X_{(1)}$," are performed on the two qubits in states $|\psi\varphi\rangle$. In the expression indicating the gate operations, matrix operators to be acted on are described in the order from right to left. A subscript at a lower right of the matrix operator is a number of the qubit to be acted on.

In the quantum computer, the gate operations indicated by the quantum circuit 32 are executed in order. At that time, there is a possibility that an error occurs in the qubit. In order to obtain a correct calculation result, it is important to be able to detect occurrence of the error and correct the error.

Figure 5:
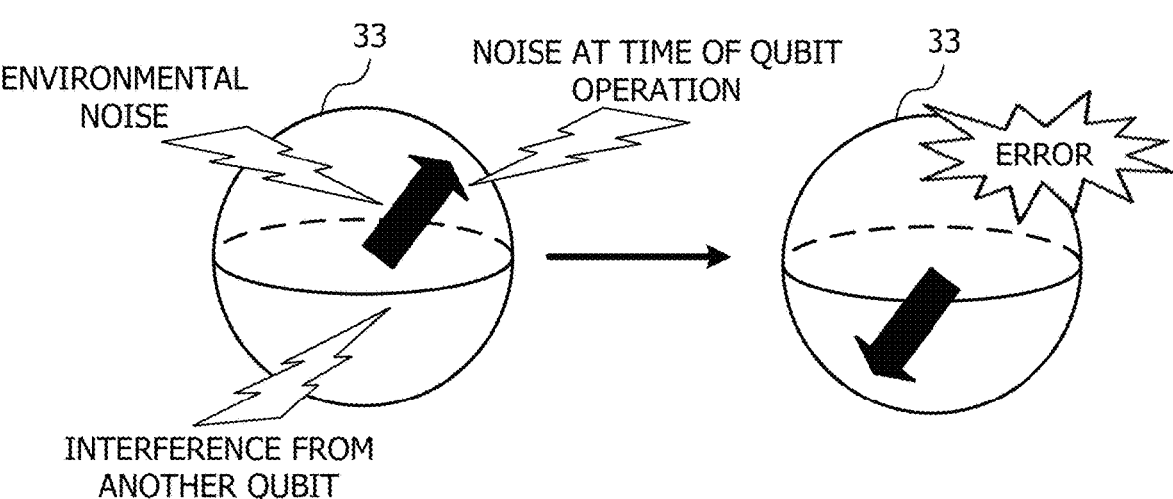
FIG. 5 is a diagram illustrating an example of an error occurrence state in a qubit.

FIG. 5 is a diagram illustrating an example of an error occurrence state in a qubit. A qubit 33 is affected by various types of noise. Examples of the types of noise include environmental noise, noise at the time of a qubit operation, interference from another qubit, and the like. There is a possibility that a state of the qubit 33 changes unintentionally due to the influence of the noise. Such an unintended state change is an error of the qubit. Types of the error that occurs in the qubit are classified into the following two types.

Bit inversion error (X error): $|0\rangle \to |1\rangle$, $|1\rangle \to |0\rangle$ Phase inversion error (Z error): $|+\rangle \to |-\rangle$, $|-\rangle \to |+\rangle$ The bit inversion error is mathematically the same as causing the Pauli operator X to be acted on the quantum state. Similarly, the phase inversion error is the same as causing the Pauli operator Z to be acted on the quantum state.

In other words, the error of the qubit may be corrected by causing the Pauli operator (X, Z) same as the error to be acted on. Such an operation is referred to as quantum error correction. For example, a case is assumed where correction using the Pauli operator X is performed on a qubit in which an X error has occurred. The X error is represented by the following Expression (8), and a gate operation for the correction is represented by Expression (9).

[Expression 8]

$$X \text{ error: } \begin{pmatrix}1\\0\end{pmatrix} \to \begin{pmatrix}0\\1\end{pmatrix} \quad (8)$$

-continued

[Expression 9]

$$\text{Correction:} \begin{pmatrix} 0 \\ 1 \end{pmatrix} \rightarrow X \begin{pmatrix} 0 \\ 1 \end{pmatrix} = \begin{pmatrix} 0 & 1 \\ 1 & 0 \end{pmatrix} \begin{pmatrix} 0 \\ 1 \end{pmatrix} = \begin{pmatrix} 1 \\ 0 \end{pmatrix} \tag{9}$$

By the occurrence and the correction of the error, the quantum state changes as "$|0>\rightarrow|1>\rightarrow|0>$". In order to perform such error correction, it is needed to specify the qubit in which the error has occurred (error qubit) and content of the error (whether it is bit inversion (X error) or phase inversion (Z error)). Therefore, redundancy of the qubit is performed in order to specify the error qubit and the error content.

Figure 6:
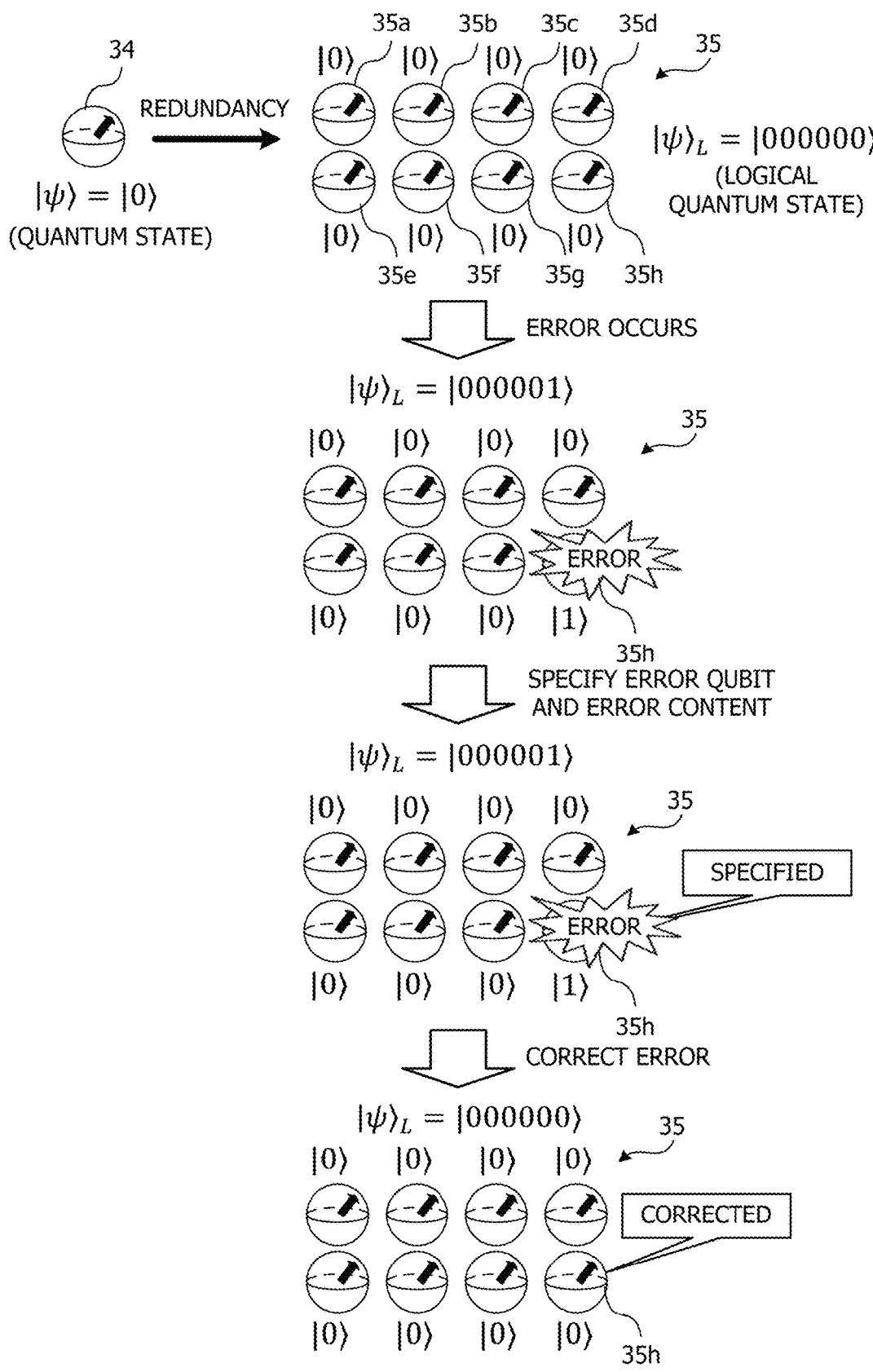
FIG. 6 is a diagram illustrating an example of redundancy of a qubit.

FIG. 6 is a diagram illustrating an example of the redundancy of the qubit. In FIG. 6, an example of redundancy using eight qubits is illustrated. In a case where a qubit is made redundant, a quantum state $|\psi>$ represented by one qubit 34 is represented by a logical quantum state $|\psi>_L$ by a logical qubit 35. The logical qubit 35 includes a plurality of qubits 35a to 35h.

Here, it is assumed that an error has occurred in one qubit 35h constituting the logical qubit 35. In this case, the error qubit and error content are specified by specification processing of an error qubit and error content.

In a case where the qubit 35h is correctly specified as the error qubit and the error content is also correctly specified, a gate operation for error correction is performed on the qubit 35h. By the error correction, the state of the logical qubit 35 is corrected to a state in a case where no error has occurred.

In the example of FIG. 6, it is assumed that the error qubit has been correctly specified, but it is not easy to specify the error qubit. Information regarding states of the qubits 35a to 35h constituting the logical qubit 35 is used to specify the error qubit, but when the qubit is directly measured, the quantum state breaks and the calculation may not be continued. Therefore, by introducing an auxiliary qubit and measuring a state of the auxiliary qubit, the information regarding the states of the qubits 35a to 35h constituting the logical qubit 35 is acquired.

Figure 7:
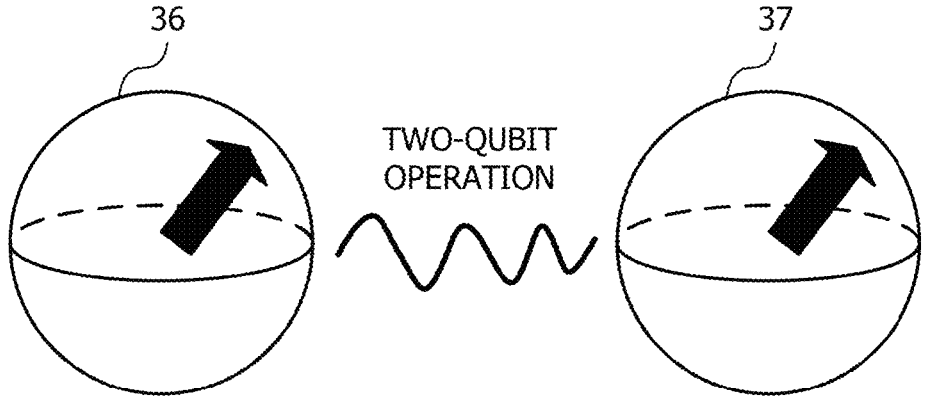
FIG. 7 is a diagram illustrating an example of measurement using an auxiliary qubit.

FIG. 7 is a diagram illustrating an example of measurement using the auxiliary qubit. A state of a qubit 36 may not be copied to an auxiliary qubit 37. Therefore, a two-qubit operation is performed on the qubit 36 and the auxiliary qubit 37. A state of the auxiliary qubit 37 is changed according to the state of the qubit 36 by the two-qubit operation. By measuring the state of the auxiliary qubit 37, a change in the state of the auxiliary qubit 37 from an initial state may be detected. The state of the qubit 36 may be known depending on whether or not the state of the auxiliary qubit 37 has changed from the initial state.

There is the surface code as a method of specifying an error qubit based on a state of a qubit obtained using an auxiliary qubit. The surface code is a typical coding (redundancy) method in quantum error correction.

Figure 8:
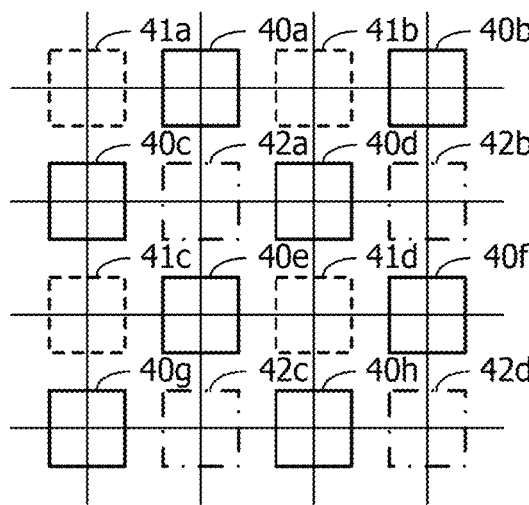
FIG. 8 is a diagram illustrating an example of a configuration of a qubit for performing a surface code.

FIG. 8 is a diagram illustrating an example of a configuration of qubits for performing the surface code. In the example of FIG. 8, the qubits are arranged in a two-dimensional lattice pattern. Data qubits 40a to 40h and auxiliary qubits 41a to 41d and 42a to 42d are alternately arranged in each of the row direction and the column direction. The auxiliary qubits 41a to 41d and 42a to 42d are divided into the auxiliary qubits 41a to 41d for X error detection and the auxiliary qubits 42a to 42d for Z error detection. Additionally, the auxiliary qubits 41a to 41d for X error detection and the auxiliary qubits 42a to 42d for Z error detection are alternately arranged for each column.

Note that the qubits illustrated in FIG. 8 are a part of qubits used for error correction by the surface code. In a case where the error correction by the surface code is performed, the number of quanta of one side of a two-dimensional lattice including all the qubits used for the error correction (a sum of data qubits and auxiliary qubits) is an odd number, and data qubits are arranged at four corners (see FIG. 11).

Presence or absence of an error may be detected by appropriately initializing a logical quantum state first, performing a gate operation (two-qubit operation) between one auxiliary qubit and four surrounding data qubits when error detection is performed, and performing measurement of the auxiliary qubit.

Figure 9:
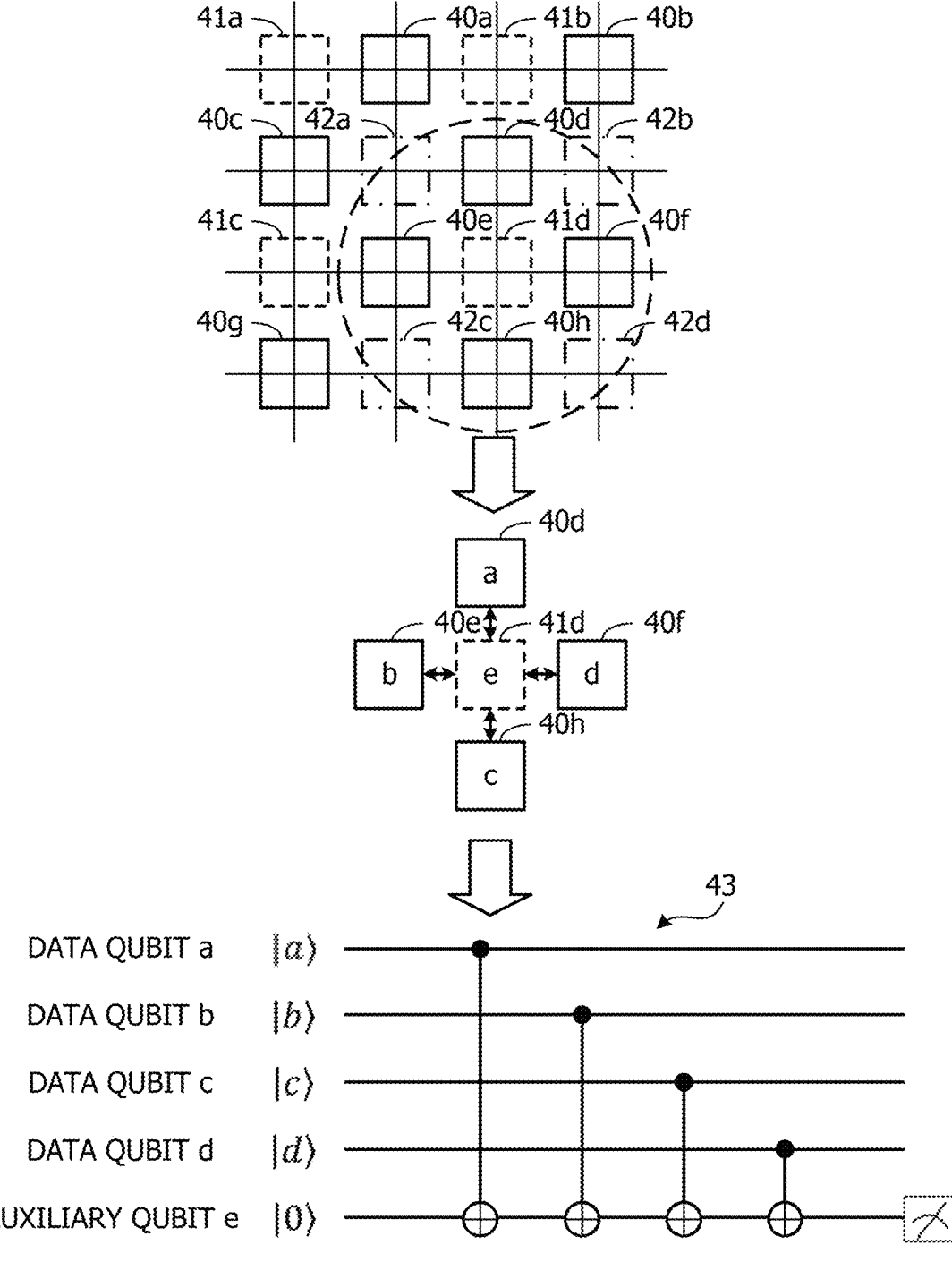
FIG. 9 is a diagram illustrating an example of a gate operation for X error detection.

FIG. 9 is a diagram illustrating an example of a gate operation for X error detection. For example, a case is assumed where an error in any one of the data qubits 40d, 40e, 40h, and 40f adjacent to the auxiliary qubit 41d is detected using the auxiliary qubit 41d. Here, it is assumed that an identifier of the data qubit 40d is "a", an identifier of the data qubit 40e is "b", an identifier of the data qubit 40h is "c", an identifier of the data qubit 40f is "d", and an identifier of the auxiliary qubit 41d is "e".

X error detection for the data qubits 40d, 40e, 40h, and 40f may be performed by performing a gate operation as illustrated in a quantum circuit 43 on these qubits. In the quantum circuit 43, it is indicated that a CNOT gate operation is performed in which it is assumed that each of the data qubits 40d, 40e, 40h, and 40f is a control qubit, and the auxiliary qubit 41d is a target qubit. By such a gate operation, in a case where an X error has occurred in one of the data qubits 40d, 40e, 40h, and 40f, a state of the auxiliary qubit 41d changes from an initial state. In the example of FIG. 6, since the initial state of the auxiliary qubit 41d is $|0>$, in a case where a state of $|1>$ is detected by measurement of the auxiliary qubit 41d, it may be determined that an X error has occurred in any one of the data qubits 40d, 40e, 40h, and 40f.

Figure 10:
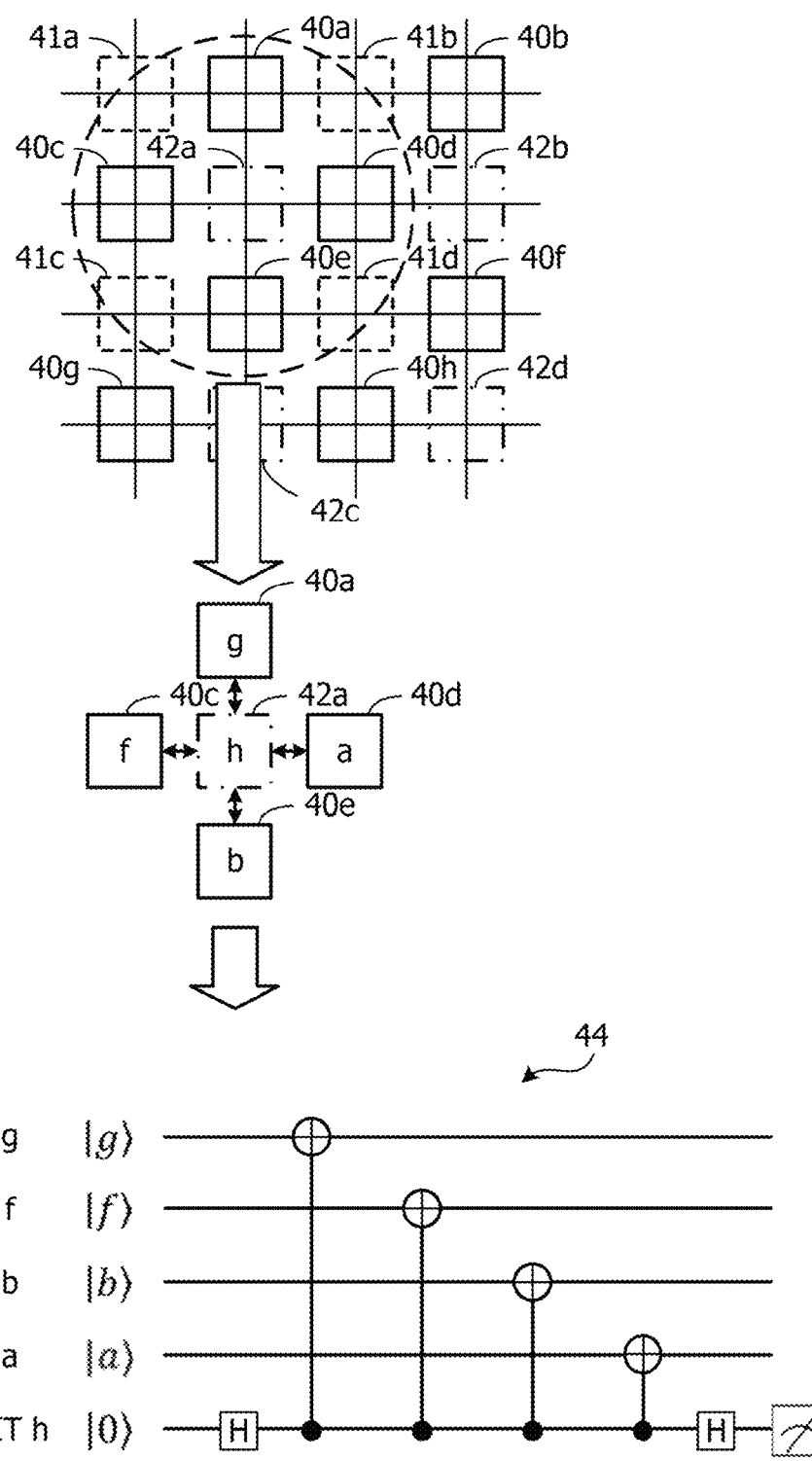
FIG. 10 is a diagram illustrating an example of a gate operation for Z error detection.

FIG. 10 is a diagram illustrating an example of a gate operation for Z error detection. For example, a case is assumed where an error in any one of the data qubits 40a, 40c, 40d, and 40e adjacent to the auxiliary qubit 42a is detected using the auxiliary qubit 42a. Here, it is assumed that an identifier of the data qubit 40a is "g", an identifier of the data qubit 40c is "f", and an identifier of the auxiliary qubit 42a is "h". As illustrated in FIG. 9, the identifier of the data qubit 40d is "a", and the identifier of the data qubit 40e is "b".

Z error detection for the data qubits 40a, 40c, 40d, and 40e may be performed by performing a gate operation as illustrated in a quantum circuit 44 on these qubits. In the quantum circuit 44, it is indicated that an Hadamard gate operation is performed first on the auxiliary qubit 42a. Thereafter, a CNOT gate operation is performed in which it is assumed that each of the data qubits 40a, 40c, 40d, and 40e is a target qubit, and the auxiliary qubit 42a is a control qubit. Moreover, the Hadamard gate operation is performed on the auxiliary qubit 42a. Note that, in the state indicated in the quantum circuit 44, in a CNOT gate operation between a data qubit in which a Z error has occurred and the auxiliary qubit 42a, in contrast to a normal case, a state of the auxiliary qubit 42a which is the control qubit changes according to a state of the target qubit.

By such a gate operation, in a case where a Z error has occurred in one of the data qubits 40a, 40c, 40d, and 40e, the state of the auxiliary qubit 42a changes from an initial state.

In the example of FIG. 6, since the initial state of the auxiliary qubit 42a is 10>, in a case where a state of |1> is detected by measurement of the auxiliary qubit 42a, it may be determined that a Z error has occurred in any one of the data qubits 40a, 40c, 40d, and 40e.

Next, initialization of a data qubit will be described. When the logical quantum state $|\psi>_L$ is optionally determined, due to the gate operation for the error detection illustrated in FIG. 9 or 10, states of data qubits and auxiliary qubits change even in a case where there is no error. To avoid that, the logical quantum state $|\psi>_L$ is initialized to be an eigenstate of a stabilizer operator (eigenvalue is +1 or −1). The stabilizer operator is a product of Z or X operators acting on four data qubits around an auxiliary qubit.

For example, a stabilizer operator for X error detection illustrated in FIG. 9 is "$Z_{(i1)}Z_{(i2)}Z_{(i3)}Z_{(i4)}|\psi>_L=\pm|\psi>_L$". An index of an auxiliary qubit for X error detection is represented by i. A number that distinguishes data qubits around an auxiliary qubit is represented by a number to the right of i. For example, based on the auxiliary qubit, an upper data qubit is "1", a left data qubit is "2", a lower data qubit is "3", and a right data qubit is "4". For example, $Z_{(i1)}$ indicates a Z operator acting on a data qubit above an i-th auxiliary qubit.

Furthermore, a stabilizer operator for Z error detection illustrated in FIG. 10 is "$X_{(j1)}X_{(j2)}X_{(j3)}X_{(j4)}|\psi>_L=\pm|\psi>_L$". An index of an auxiliary qubit for Z error detection is represented by j. A number that distinguishes data qubits around an auxiliary qubit is represented by a number to the right of j.

As described above, by the initialization of the logical quantum state $|\psi>_L$, even when an auxiliary qubit is measured, the states of the qubits are not affected.

Next, a calculation of a logical qubit will be described. The error detection is processing frequently performed between calculations. Therefore, the logical quantum state needs to be maintained at the eigenstate of the stabilizer operator not only in the initial state but also during the calculation. Therefore, in a case where an operation is performed on the logical qubit, operators that change the logical quantum state without breaking the eigenstate of the stabilizer operator are used. These operators are referred to as logical operators.

Examples of the logical operators include a logical Z operator Lz, a logical X operator Lx, and the like. These logical operators satisfy the following properties.

A first property is that the logical operator satisfies a commutation relation with all stabilizer operators. For example, regarding the logical Z operator Lz, it is assumed that the stabilizer operator is S, and the logical quantum state $|\psi>_L$ is an eigenstate of S ($S|\psi>_L=|\psi>_L$). In this case, $SLz|\psi>_L=LzS|\psi>_L=Lz|\psi>_L$ holds from a commutation relation SLz=LzS. $Lz|\psi>_L$ is different from the original $|\psi>_L$, but is maintained at the eigenstate of S.

A second property is that Lx and Lz satisfy an anticommutation relation. In other words, "LxLz=−LzLx" is satisfied.

Figure 11:
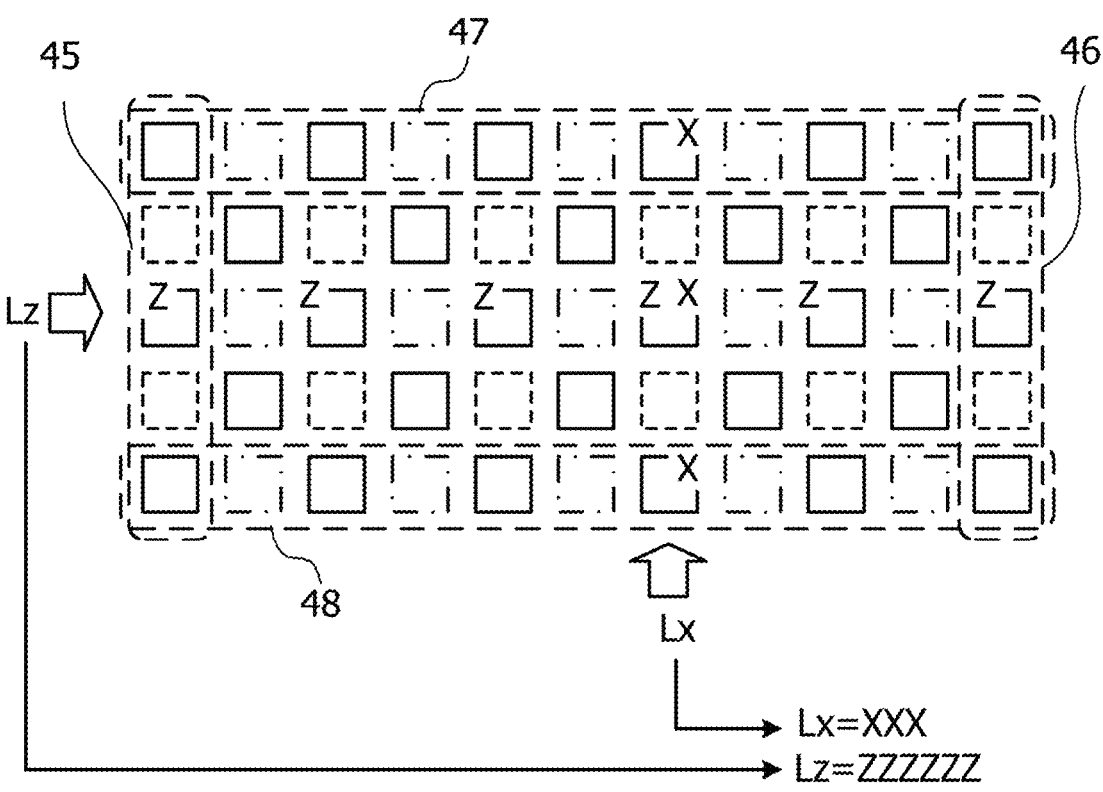
FIG. 11 is a diagram for describing mathematical expressions of a logical Z operator $Lz$ and a logical X operator $Lx$.

FIG. 11 is a diagram for describing mathematical expressions of the logical Z operator Lz and the logical X operator Lx. Among left and right and upper and lower boundaries in an array in a lattice pattern of qubits constituting a logical qubit, boundaries at which auxiliary qubits for X error detection are arranged are referred to as rough boundaries 45 and 46. Furthermore, boundaries at which auxiliary qubits for Z error detection are arranged are referred to as smooth boundaries 47 and 48.

The logical Z operator Lz is mathematically represented by a product of Z operators for data qubits from one rough boundary 45 to the rough boundary 46 on an opposite side. The logical Z operator Lz performs phase inversion on the logical quantum state ($Lz|0>_L=|0>_L$, $Lz|1>_L=-|1>_L$).

The logical X operator Lx is mathematically represented by a product of X operators for data qubits from one smooth boundary 47 to the smooth boundary 48 on an opposite side. The logical X operator Lx performs bit inversion on the logical quantum state ($Lx|0>_L=|1>_L$, $Lx|1>_L=|0>_L$).

Next, an error detection method using the surface code will be described. In the surface code, in a case where an X error has occurred in one data qubit, the state $|\psi>_L$ changes to an eigenstate $|\psi'>_L$ in which the eigenvalue of the stabilizer operator is different.

Figure 12:
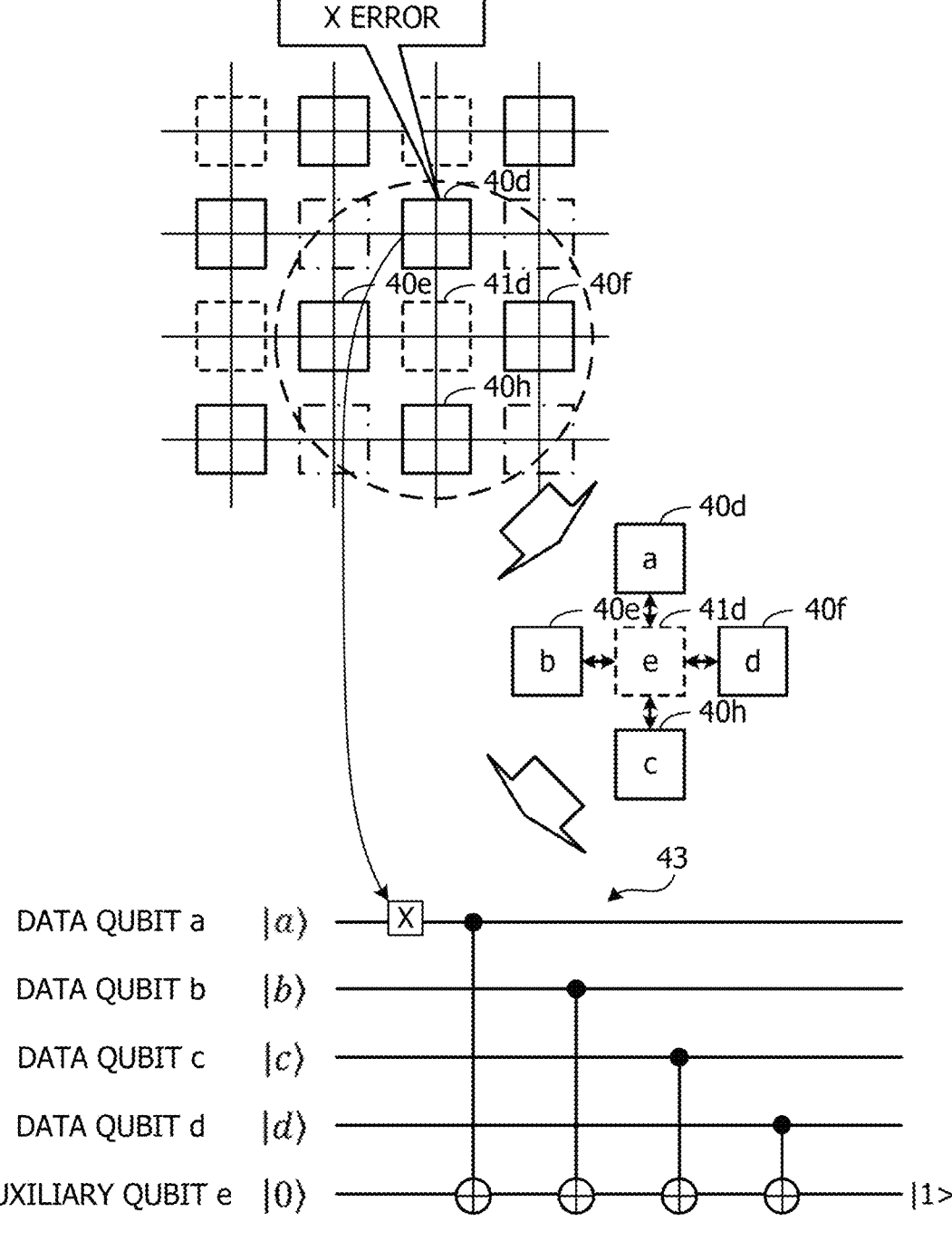
FIG. 12 is a diagram illustrating an example of the X error detection.

FIG. 12 is a diagram illustrating an example of X error detection. For example, in a case where $|\psi>_L$ is the eigenvalue+1, when an X error occurs in one of data qubits around the i-th auxiliary qubit, "$|\psi'>_L=X_{(i1)}|\psi>_L$" holds. In the example of FIG. 12, it is assumed that an error has occurred in the data qubit 40d.

At this time, when a Z stabilizer operator around the auxiliary qubit 41d is acted on the data qubit 40d in which the error has occurred, "$Z_{(i1)}Z_{(i2)}Z_{(i3)}Z_{(i4)}|\psi'>_L$" is represented. This expression may be modified as follows using the relationship "$|\psi'>_L=X_{(i1)}|\psi>_L$".

$$Z_{(i1)}Z_{(i2)}Z_{(i3)}Z_{(i4)}|\psi'>_L=Z_{(i1)}Z_{(i2)}Z_{(i3)}Z_{(i4)}X_{(i1)}|\psi>_L=Z_{(i1)}X_{(i1)}Z_{(i2)}Z_{(i3)}Z_{(i4)}|\psi>_L$$

Since a Z operator and a Z operator satisfy an anticommutation relation, modification may be further made as follows.

$$Z_{(i1)}X_{(i1)}Z_{(i2)}Z_{(i3)}Z_{(i4)}|\psi>_L=-X_{(i1)}Z_{(i1)}Z_{(i2)}Z_{(i3)}Z_{(i4)}|\psi>_L=-X_{(i1)}|\psi>_L=-|\psi'>_L$$

"$-|\psi'>_L$" indicates that the eigenvalue changes to "−1". This change in the eigenvalue may be detected as bit inversion of the auxiliary qubit 41d by using the quantum circuit 43 (initialized by $|\psi>_L=|0000>+|1111>$).

In this way, it may be described that, by measuring an auxiliary qubit, occurrence of an error in one of surrounding data qubits may be detected. However, with only one auxiliary qubit, it is not possible to know in which of the surrounding data qubits the error has occurred. Therefore, a data qubit in which the error has occurred is specified based on a positional relationship between two or more auxiliary qubits in which the error has been detected among the plurality of auxiliary qubits.

Figure 13:
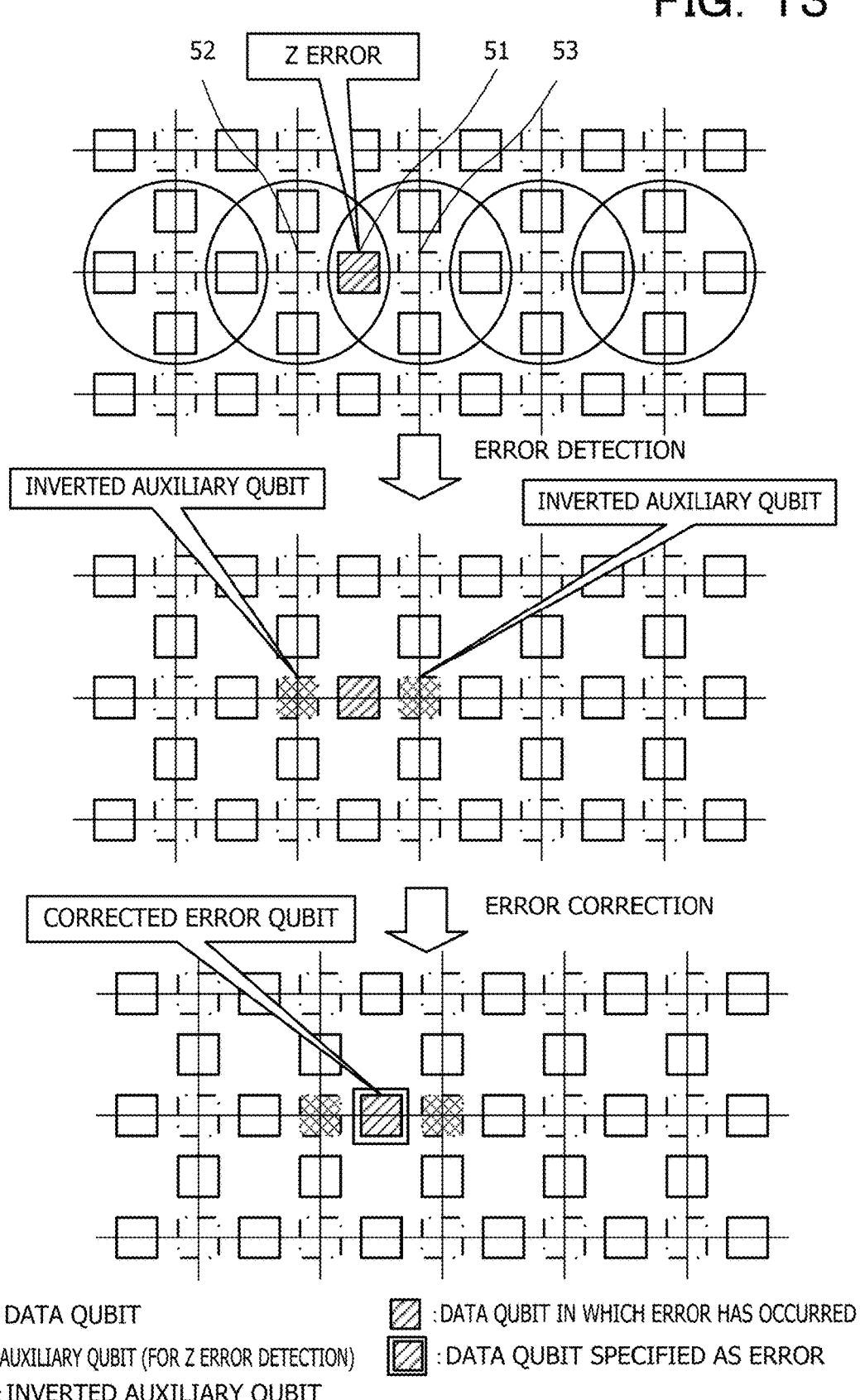
FIG. 13 is a diagram illustrating an example of specification of an error portion.

FIG. 13 is a diagram illustrating an example of specification of an error portion. Although an example of specification of an error portion of a Z error is illustrated in FIG. 13, an error portion may similarly be specified also for an X error. In FIG. 13, auxiliary qubits for X error detection are omitted among auxiliary qubits (the same applies to FIGS. 14 to 20).

Here, it is assumed that a Z error has occurred in a data qubit 51. In error detection processing, for all the auxiliary qubits, error detection is performed by a gate operation similar to that of the quantum circuit 44 illustrated in FIG. 10, and states are measured. In FIG. 13, the auxiliary qubits to be measured and data qubits to be subjected to the error detection by the auxiliary qubits are surrounded by circles.

The data qubit 51 in which the error has occurred is in the same circles as each of two auxiliary qubits 52 and 53. In this case, it is detected that states of the auxiliary qubits 52 and 53 have been inverted by the measurement. As the states of the auxiliary qubits 52 and 53 are inverted, the data qubit 51 at a position sandwiched therebetween is specified as an error occurrence portion. Therefore, an operation of error correction (Z gate operation) is performed on the data qubit 51.

As described above, when there is only one error portion, the error portion may be uniquely specified. However, in a case where two or more errors occur and error occurrence portions are close to each other, there is a possibility that the error occurrence portions may not be uniquely specified.

Note that error correction occurring at two close portions may be successful. It is known that, in a case where a plurality of errors has occurred in data qubits of a certain one side of a lattice among qubits arranged in a lattice pattern, error correction may be successful when the number of errors is smaller than half of the number of data qubits of the one side of the lattice. For example, in a lattice in which the number of data qubits on one side is nine, even when errors accidentally occur in a concentrated manner on a certain one side, error correction may be performed in principle up to four errors. In contrast, in a case where five or more errors occur, the remaining four errors are erroneously corrected according to a theory of the surface code. As a result, all the data qubits on the one side are inverted. This state is a state where a logical error has occurred. As described above, in a case where an error has occurred in the sufficiently large number of data qubits, there is a high possibility that a logical error occurs.

FIG. 14 is a diagram illustrating an example of a case where it is not possible to uniquely specify an error occurrence portion. In the example of FIG. 14, an error has occurred in two data qubits. There is a difference of one row and three columns between positions of the data qubits in which the error has occurred. In this case, states of four auxiliary qubits adjacent to any one of the data qubits in which the error has occurred are inverted (measurement information becomes "–1"). The position of the error qubit is attempted to be specified based on the inverted four auxiliary qubits.

There are three error occurrence patterns in which the four inverted auxiliary qubits are inverted and the other auxiliary qubits are not inverted. A first error occurrence pattern 61 is an example in a case where the data qubits in which the error has occurred are correctly specified. A second error occurrence pattern 62 and a third error occurrence pattern 63 are examples in a case where the data qubits in which the error has occurred are failed to be correctly specified.

As described above, in a case where there is a plurality of error occurrence patterns in which four inverted auxiliary qubits are inverted and the other auxiliary qubits are not inverted, an error portion may not be uniquely determined. Note that, in quantum error correction, even when a data qubit in which an error has occurred may not be correctly specified, it is sufficient that the logical quantum state is maintained in a correct state by error correction. Then, when a predetermined condition is satisfied, the logical quantum state may be set to the correct state by correcting a data qubit different from the data qubit in which the error has occurred.

Figure 15:
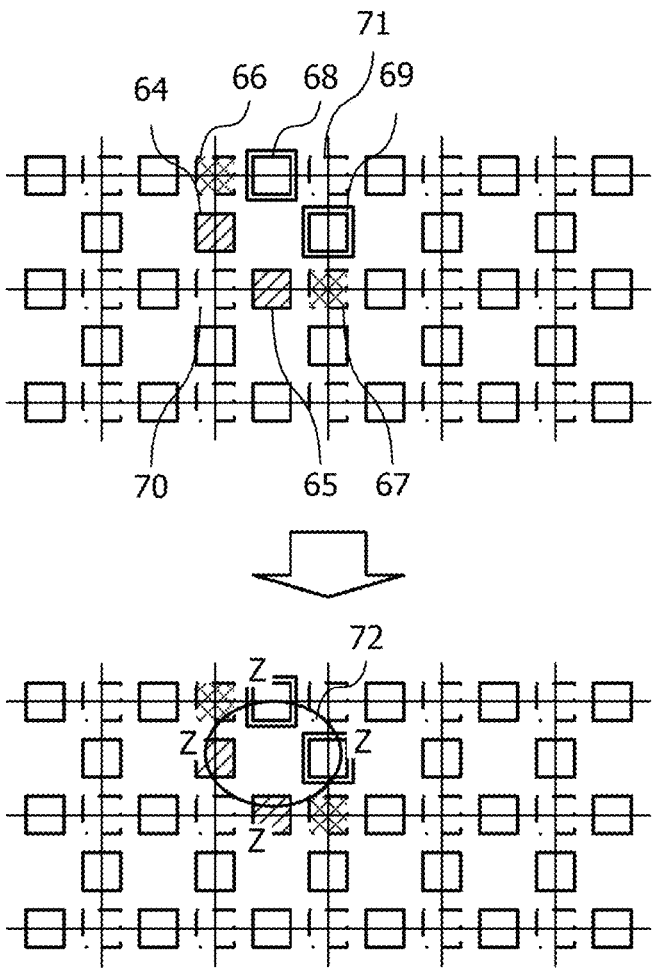
FIG. 15 is a diagram illustrating an example of error correction by correction of a data qubit different from a portion in which an error has occurred.

FIG. 15 is a diagram illustrating an example of error correction by correction of a data qubit different from a portion in which an error has occurred. In FIG. 15, an error has occurred in two data qubits 64 and 65. The data qubits 64 and 65 are shifted by one row in the row direction and are also shifted by one row in the column direction. In this case, due to error detection, a state of an auxiliary qubit 66 adjacent above the data qubit 64 is inverted, and a state of an auxiliary qubit 67 adjacent on the right of the data qubit 65 is inverted. Note that, since an auxiliary qubit 70 adjacent below the data qubit 64 is adjacent on the left of the data qubit 65, a state thereof is not inverted.

At this time, as an error occurrence pattern in which the auxiliary qubits 66 and 67 are inverted and the other auxiliary qubits are not inverted, there is a case where an error has occurred in data qubits 68 and 69 in addition to the case where the error has occurred in the data qubits 64 and 65. Here, it is assumed that an error correction operation is performed on the data qubits 68 and 69 instead of the data qubits 64 and 65 in which the error has occurred.

Then, a loop 72 is formed by the data qubits 68 and 69 on which the error correction has been performed and the data qubits 64 and 65 in which the error has not been corrected. Here, the formation of the loop 72 means that a closed curve is formed when the data qubits adjacent to the common auxiliary qubit for Z error detection among the erroneously corrected data qubits and the data qubits in which the error has not been corrected are coupled to each other by lines. Note that, in a case there an X error is corrected, the loop 72 is formed by coupling, by lines, the data qubits adjacent to the common auxiliary qubit for Z error detection among the erroneously corrected data qubits and the data qubits in which the error has not been corrected, to each other.

In the example of FIG. 15, the two data qubits 64 and 65 in which the error has not been corrected are both adjacent to the auxiliary qubit 70, and thus may be coupled by a line. Since the data qubit 65 in which the error has not been corrected and the erroneously corrected data qubit 69 are both adjacent to the auxiliary qubit 67, and thus may be coupled by a line. The two erroneously corrected data qubits 68 and 69 are both adjacent to an auxiliary qubit 71, and thus may be coupled by a line. Since the erroneously corrected data qubit 68 and the data qubit 64 in which the error has not been corrected are both adjacent to the auxiliary qubit 66, and thus may be coupled by a line. As a result, the lines coupling the data qubits 64 and 65 in which the error has not been corrected and the erroneously corrected data qubits 68 and 69 form the closed curve. In other words, the loop 72 is formed.

A plurality of the loops may be formed. In a case where all of the erroneously corrected data qubits and the data qubits in which the error has not been corrected belong to any one of the loops, the logical quantum state is maintained at an original state (state where the data qubits in which the error has occurred have been correctly corrected). In other words, in a case where the loops are formed, both of the data qubits 64 and 65 in which the error has not been corrected and the data qubits 68 and 69 on which error correction has been performed are mathematically in a state where a Z operator is acted on, and they form one stabilizer operator $S=ZZZZ$. Since the logical quantum state $|\psi>_L$ is the eigenstate of the stabilizer operator S ($S|\psi>_L=|\psi>_L$), the logical quantum state $|\psi>_L$ is maintained at the eigenstate of the original eigenvalue.

As described above, in the quantum error correction, even when a corrected portion does not match an actual error portion, it is sufficient that a loop is formed.

FIG. 16 is a diagram illustrating examples of error correction success patterns. An error correction success pattern 75 is a case where a data qubit in which an error has occurred and a corrected data qubit completely match. Furthermore, error correction success patterns 76 and 77 are a case where error correction is successful because a loop is formed by data qubits in which an error has not been corrected and erroneously corrected data qubits. As described above, in order to successfully perform error correction by the surface code, it is needed that a correction portion and an actual error portion completely match or a loop is formed.

Here, the number of corrected data qubits around an auxiliary qubit is focused. Then, in a state where the error correction is successful, an odd number of data qubits are corrected around the inverted auxiliary qubit. Furthermore, an even number of data qubits are corrected around the auxiliary qubit which is not inverted. Such a property is referred to as an odd-even constraint.

For example, the number of data qubits corrected around each of inverted auxiliary qubits 75a and 75b in the error correction success pattern 75 is "1" (odd number). Furthermore, the number of data qubits corrected around an auxiliary qubit 75c which is not inverted is "0" (even number). The number of data qubits corrected around each of inverted auxiliary qubits 76a and 76b in the error correction success pattern 76 is "1" (odd number). Furthermore, the number of data qubits corrected around an auxiliary qubit 76c which is not inverted is "0" (even number). The number of data qubits corrected around each of inverted auxiliary qubits 77f and 77g in the error correction success pattern 77 is "1" (odd number). Furthermore, the number of data qubits corrected around each of auxiliary qubits 77a to 77e which are not inverted is "2" (even number).

Note that such an odd-even constraint is a necessary condition for successful error correction, and is not a sufficient condition. In other words, after the error correction, the error correction may be failed even when the odd-even constraint is followed. In that case, arrangement of data qubits inverted due to an error or erroneous correction does not form a loop, and is in a state where the data qubits are coupled from one boundary to a boundary on the opposite side. Mathematically, this is a state where the logical Z operator Lz or the logical X operator Lx acts on the logical quantum state $|\psi>_L$, and is referred to as a logical error.

Figure 17:
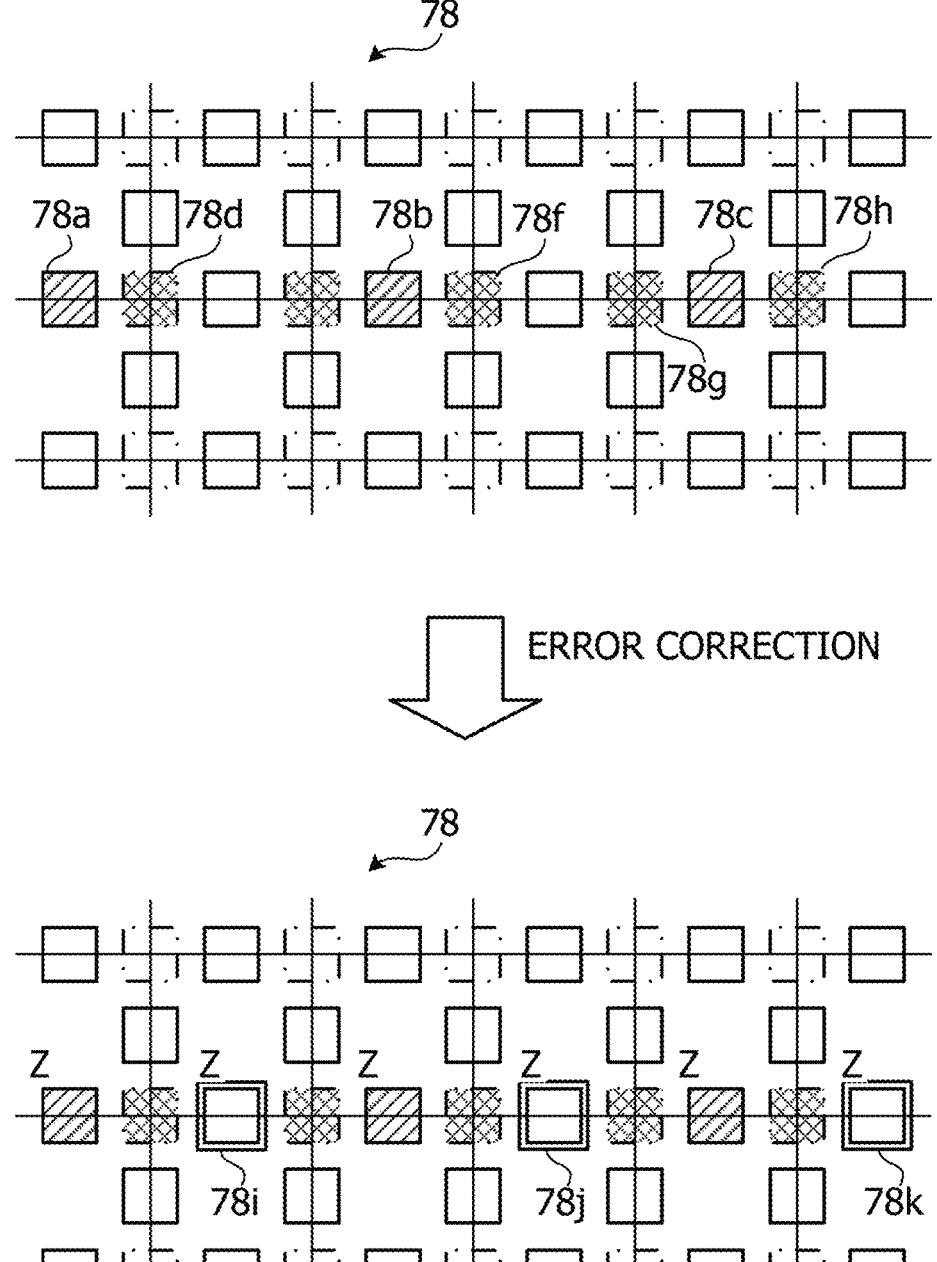
FIG. 17 is a diagram illustrating an example of a logical error due to erroneous correction.

FIG. 17 is a diagram illustrating an example of a logical error due to erroneous correction. In an error occurrence pattern 78 illustrated in FIG. 17, a Z error occurs in each of data qubits 78a to 78c which is one of data qubits in the same column. In this case, states of auxiliary qubits 78d to 78h adjacent to any one of the data qubits 78a to 78c in the same column are inverted. At this time, it is assumed that an error correction operation is performed on data qubits 78i to 78k different from the data qubits 78a to 78c in which the error has occurred. Even in such error correction, the odd-even constraint is followed. However, the data qubits 78a to 78c in which the error has occurred do not match the corrected data qubits 78i to 78k, and no loop is formed. In other words, a logical error due to erroneous correction occurs.

When a logical error occurs, a correct calculation may not be performed. How often a logical error occurs in the surface code depends on the number of qubits constituting a logical qubit, an error occurrence frequency in each qubit, and the like. In an actual machine of the quantum computer, it is not possible to determine whether a logical error occurs unless a data qubit itself is measured, and to grasp the occurrence frequency. However, in the case of simulation of error correction using the surface code using a classical computer, since a portion where an error occurs may be known in advance, it is possible to determine presence or absence of occurrence of a logical error. The presence or absence of the occurrence of the logical error may be determined by searching coupling (error chain) of data qubits in which an error has occurred.

Hereinafter, usefulness of simulation of the surface code will be described.

At present, the quantum computer with much more than 100 qubits is not widely used in the public. Therefore, under the present circumstances, large-scale quantum error correction using the surface code may be difficult to be verified by an actual machine. However, in order to implement a quantum computer including large-scale qubits in the future, it is important to advance a study of the quantum error correction from the present time. Therefore, under the present circumstances, it is effective to reproduce the large-scale quantum error correction using the surface code by simulation using a classical computer and verify appropriateness of the error correction.

In the case where the simulation of the quantum error correction using the surface code (hereinafter, referred to as surface code simulation) is performed on the assumption of a large-scale quantum computer, it is desirable to efficiently execute determination of presence or absence of occurrence of a logical error.

Figure 18:
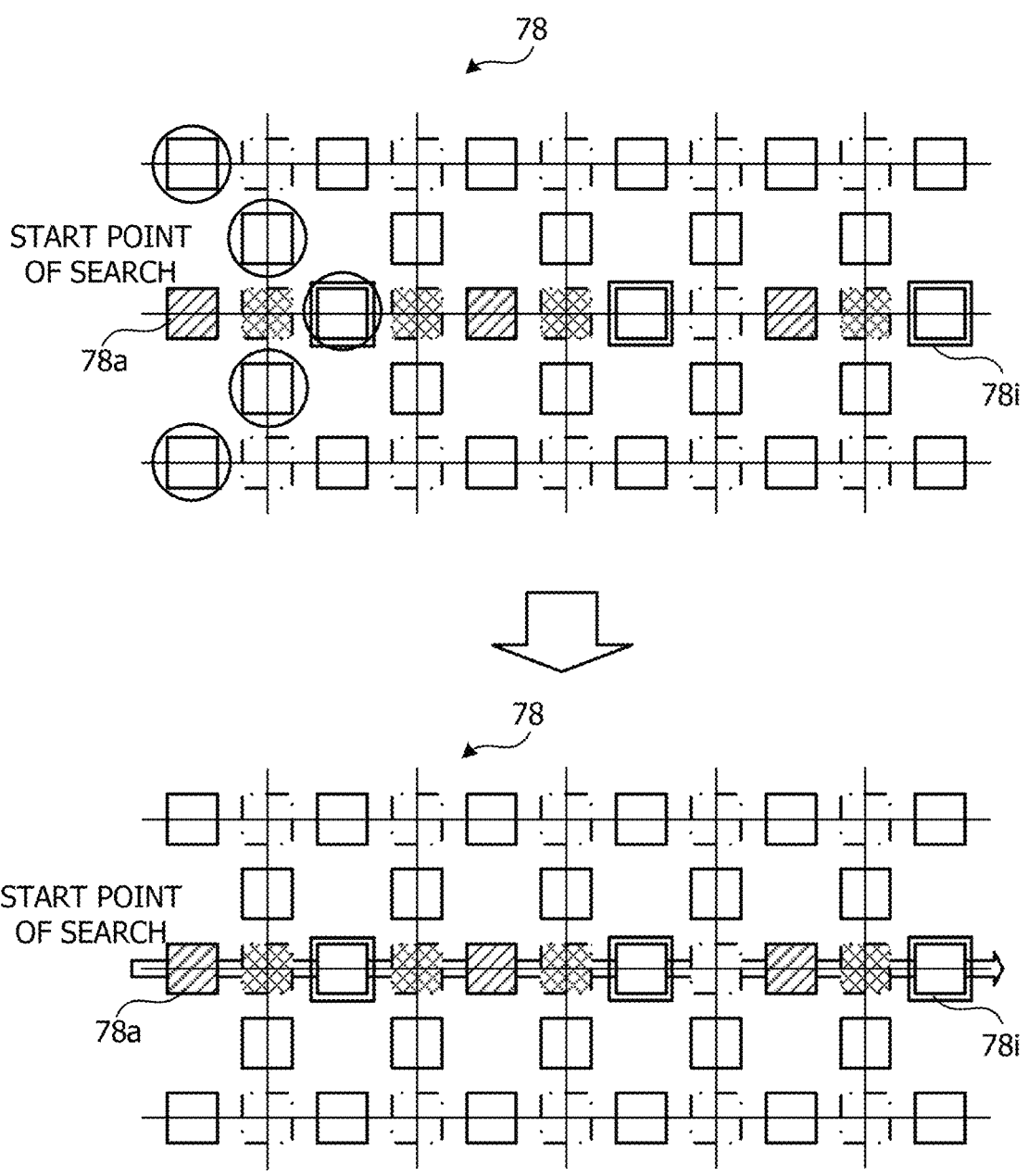
FIG. 18 is a diagram illustrating an example of logical error determination by a search of an error chain.

FIG. 18 is a diagram illustrating an example of logical error determination by a search of an error chain. When the surface code is simulated by a classical computer and a logical error is determined, the computer searches whether an error chain is coupled from one boundary to the other boundary in a two-dimensional lattice. Specifically, first, when there is a data qubit that is inverted among data qubits at a boundary, the computer uses the data qubit as a start point of the search. In the example of FIG. 18, the data qubit 78a is the start point of the search.

Next, in order from the data qubit 78a as the start point, the computer determines whether or not a data qubit adjacent to the same auxiliary qubit is inverted. When a state of a data qubit adjacent to the same auxiliary qubit as a data qubit whose state is inverted is inverted, the computer couples the data qubit to the error chain. Then, when the error chain is finally coupled to the data qubit 78i at the boundary on the opposite side, the computer determines that a logical error occurs.

In the case of the logical error determination as illustrated in FIG. 18, the number of searches increases as the number of errors increases. Furthermore, when it is assumed that the number of data qubits of one side of the two-dimensional lattice is N (N is a natural number), the number of searches increases exponentially with N when N is sufficiently large. Then, when the large-scale surface code simulation is performed, a time for logical error determination becomes long, and execution efficiency deteriorates.

Therefore, the computer 100 according to the second embodiment determines presence or absence of a logical error only by state data of data qubits for one column of a two-dimensional lattice.

Figure 19:
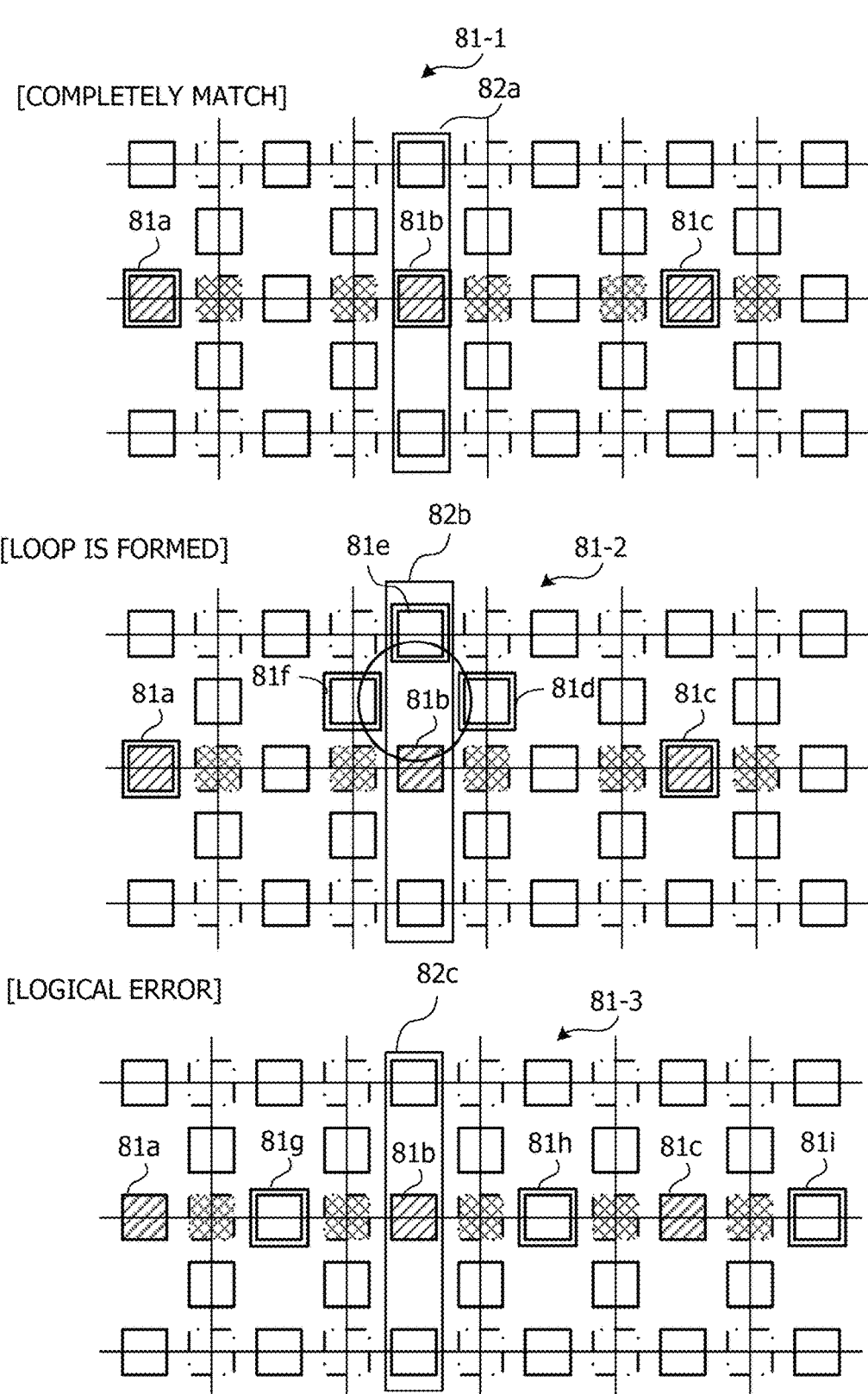
FIG. 19 is a diagram illustrating an example of logical error determination based on state data of data qubits for one column of a two-dimensional lattice.

FIG. 19 is a diagram illustrating an example of the logical error determination based on the state data of the data qubits for one column of the two-dimensional lattice. Three types of error correction patterns in a case where an error similar to that of the error occurrence pattern 78 illustrated in FIG. 17 has occurred are illustrated. An error correction success pattern 81-1 is an example of a case where data correction is performed with complete match for data qubits 81a to 81c in which an error has occurred. An error correction success pattern 81-2 is an example in which data correction of the data qubits 81a and 81c in which an error has occurred and data qubits 81d to 81f in which no error has occurred is performed, but error correction is successful by formation of a loop. An error correction failure pattern 81-3 is an example of occurrence of a logical error due to data correction of data qubits 81g to 81i in which no error has occurred.

As illustrated in FIG. 19, as a result of the error correction, when the odd-even constraint is followed, a state of the data qubit becomes one of the following states.

The error qubits have been completely corrected.

2. The inverted qubits (the data qubits in which the error has not been corrected and the erroneously corrected data qubits) form a loop.

3. A logical error has occurred.

The computer investigates whether the number of inverted qubits among the data qubits in one column (investigation target columns 82a to 82c) of the two-dimensional lattice in FIG. 19 is an even number or an odd number. Note that, as the investigation target columns 82a to 82c, for example, optional columns are selected from among columns in which data qubits exist at a smooth boundary.

In the error correction success pattern 81-1, the number of inverted qubits in the investigation target column 82a is "0" (even number). In the error correction success pattern 81-2, the number of inverted qubits in the investigation target column 82b is "2" (even number). In the error correction failure pattern 81-3, the number of inverted qubits in the investigation target column 82c is "1" (odd number).

As described above, in a case where the error correction is successful, the number of inverted qubits in the investigation target column is an even number, and in a case where a logical error occurs, the number of inverted qubits in the investigation target column is an odd number. Therefore, the computer 100 determines that a logical error occurs in a case where the number of inverted qubits in vertical one column is an odd number.

The reason why it is correct to determine that a logical error occurs in the case where the number of inverted qubits in the vertical one column is an odd number is as follows.

FIG. 20 is a diagram for describing that a logical error occurs in the case where the number of inverted qubits in the vertical one column is an odd number. In FIG. 20, a state 83 where the logical Z operator Lz acts on the two-dimensional lattice array and a state 84 where the logical X operator Lx acts on the two-dimensional lattice array are illustrated.

Here, it is assumed that the logical quantum state is $|\psi\rangle_L$, and operators acting on $|\psi\rangle_L$ through occurrence and correction of a Z error are collectively Az. In this case, whether a logical error has occurred may be determined by whether Az is equal to the logical Z operator Lz.

As described above, the logical Z operator Lz has the following properties.

Lz satisfies a commutation relation with all stabilizer operators.

Lz and Lx satisfy an anticommutation relation (LzLx=−LxLz).

When the odd-even constraint is satisfied, Az always satisfies the commutation relation with all the stabilizer operators. When Az satisfies the anticommutation relation with the logical X operator Lx, Az may be said to be equal to Lz. For example, when the number of data qubits between smooth boundaries is 3, $Lx=X_1X_2X_3$ holds. In order for Az to satisfy the anticommutation relation with Lx, it is needed that $Az=Z_1$, $Az=Z_2$, $Az=Z_3$, or $Az=Z_1Z_2Z_3$ holds. This indicates that the number of Zs (=the number of inverted qubits) is an odd number.

Although the above description is the method of logical error determination in a Z error, logical error determination in an X error may also be performed by a similar method. In the logical error determination in an X error, a logical error is determined based on data qubits in one row of the lattice (investigation target row).

Figure 21:
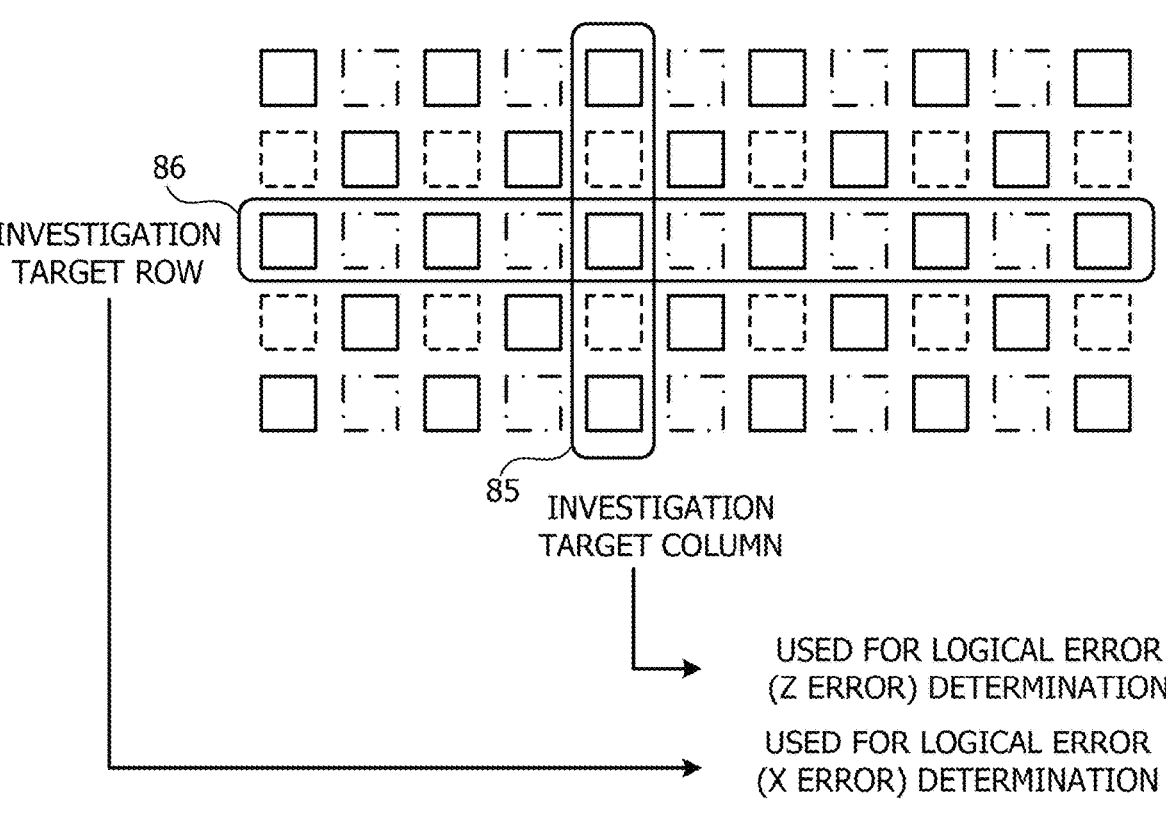
FIG. 21 is a diagram illustrating an example of a data qubit used for logical error determination.

FIG. 21 is a diagram illustrating an example of data qubits used for the logical error determination. In the example of FIG. 21, rough boundaries are sides in the column direction, and smooth boundaries are sides in the row direction. In this case, optional one column among columns in which data qubits exist at the smooth boundaries is an investigation target column 85 used for the logical error determination of a Z error. Furthermore, optional one row among rows in which data qubits exist at the rough boundaries is an investigation target row 86 used for the logical error determination of an X error.

Hereinafter, the surface code simulation with the logical error determination based on the number of inverted qubits will be specifically described.

Figure 22:
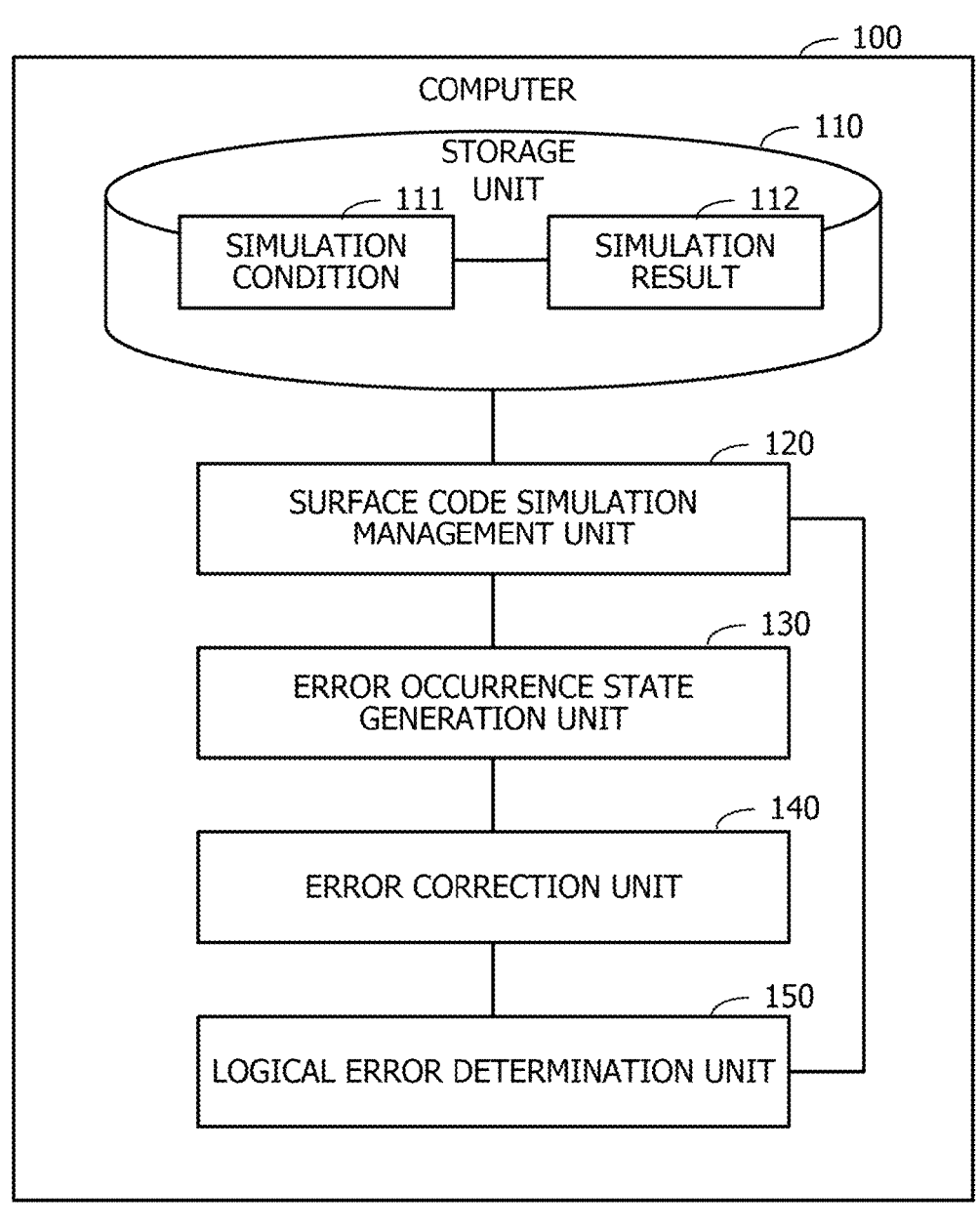
FIG. 22 is a block diagram illustrating functions of the computer for performing the surface code simulation.

FIG. 22 is a block diagram illustrating functions of the computer for performing the surface code simulation. The computer 100 includes a storage unit 110, a surface code simulation management unit 120, an error occurrence state generation unit 130, an error correction unit 140, and a logical error determination unit 150.

The storage unit 110 stores a simulation condition 111 and a simulation result 112. The simulation condition 111 includes, for example, information such as a size of a two-dimensional lattice and an error rate of a qubit. The simulation result 112 includes, for example, information such as a logical error occurrence rate.

The surface code simulation management unit 120 manages progress of the surface code simulation. For example, the surface code simulation management unit 120 receives an input of the simulation condition 111, and stores the input simulation condition 111 in the storage unit 110. Furthermore, the surface code simulation management unit 120 causes the error occurrence state generation unit 130, the error correction unit 140, and the logical error determination unit 150 to execute the surface code simulation a predetermined number of times. Moreover, the surface code simulation management unit 120 stores the simulation result 112 in the storage unit 110.

The error occurrence state generation unit 130 generates an X error or a Z error in a data qubit in a two-dimensional lattice according to the simulation condition 111. Furthermore, the error occurrence state generation unit 130 inverts a state of an auxiliary qubit according to the generated error.

The error correction unit 140 performs error correction processing based on a state of an inverted auxiliary qubit. By the error correction processing, a state of a data qubit in which it is estimated that an error has occurred is inverted.

The logical error determination unit 150 determines whether or not a state of a logical qubit indicated in a two-dimensional lattice after error correction is a logical error. The logical error determination unit 150 notifies the surface code simulation management unit 120 of a determination result.

Note that, a line coupling between the individual elements illustrated in FIG. 22 indicates a part of a communication path, and a communication path other than the illustrated communication path may also be set. Furthermore, the function of each element illustrated in FIG. 22 may be implemented by, for example, causing the computer to execute a program module corresponding to the element.

Next, a procedure of logical error determination processing using the surface code simulation will be described in detail.

Figure 23:
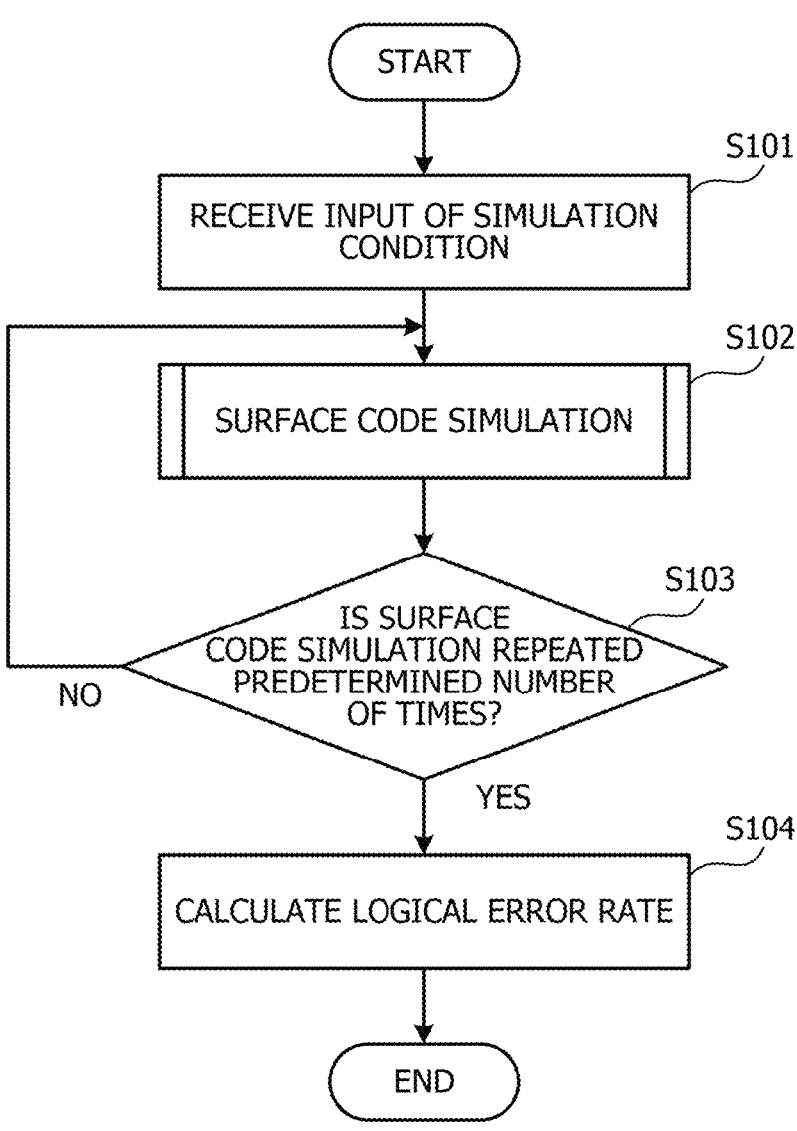
FIG. 23 is a flowchart illustrating an example of a procedure of logical error determination processing using the surface code simulation.

FIG. 23 is a flowchart illustrating an example of the procedure of the logical error determination processing using the surface code simulation. Hereinafter, the processing illustrated in FIG. 23 will be described along step numbers.

[Step S101] The surface code simulation management unit 120 receives an input of the simulation condition 111 from a user. When the simulation condition 111 is input, the surface code simulation management unit 120 stores the simulation condition 111 in the storage unit 110.

[Step S102] The surface code simulation management unit 120 executes surface code simulation in cooperation with the error occurrence state generation unit 130, the error correction unit 140, and the logical error determination unit 150. Details of processing of the surface code simulation will be described later (see FIG. 24). By the surface code simulation, information indicating presence or absence of occurrence of a logical error in a case where error correction by the surface code indicated in the simulation condition 111 is performed is obtained.

[Step S103] The surface code simulation management unit 120 determines whether or not the surface code simulation is repeated a predetermined number of times (for example, 10,000 times). In a case where the number of repetitions reaches the predetermined number of times, the surface code simulation management unit 120 advances the processing to step S104. Furthermore, in a case where the number of repetitions is less than the predetermined number of times, the surface code simulation management unit 120 advances the processing to step S102.

[Step S104] The surface code simulation management unit 120 calculates a logical error occurrence rate based on the information indicating presence or absence of a logical error obtained by the predetermined number of times of surface code simulation. The logical error occurrence rate is, for example, a value obtained by dividing the number of times of determination that a logical error has occurred by the surface code simulation by the number of repetitions of the surface code simulation.

Furthermore, in a case where a plurality of data correction patterns exists according to an error occurrence pattern, presence or absence of a logical error in each of the plurality of data correction patterns according to one error occurrence pattern may be determined in the surface code simulation. In this case, for example, the surface code simulation management unit 120 calculates a logical error occurrence rate for each error occurrence pattern. The logical error occurrence rate in this case is a ratio of a data correction pattern determined to have a logical error among the plurality of data correction patterns corresponding to one error occurrence pattern. For example, the surface code simulation management unit 120 calculates, as the simulation result 112, an average of the logical error occurrence rates of the respective plurality of error occurrence patterns. Then, the surface code simulation management unit 120 stores the simulation result 112 including the logical error occurrence rate in the storage unit 110.

In this way, the logical error occurrence rate according to the simulation condition 111 is obtained.

FIG. 24 is a diagram illustrating an example of the simulation condition. The simulation condition 111 includes, for example, the following data.

State data of data qubit: $q_i$(i=1, . . . , $N_{data}$)
($N_{data}$ is the number of data qubits)
State data of auxiliary qubit: $a_i$(i=1, . . . , $N_{sub}$)
($N_{sub}$ is the number of auxiliary qubits)
Z Error rate data: Rz
X error rate data: Rx The Z error rate data is data indicating a probability that a Z error occurs in a data qubit. The X error rate data is data indicating a probability that an X error occurs in a data qubit.

Next, details of the processing of the surface code simulation will be described.

Figure 25:
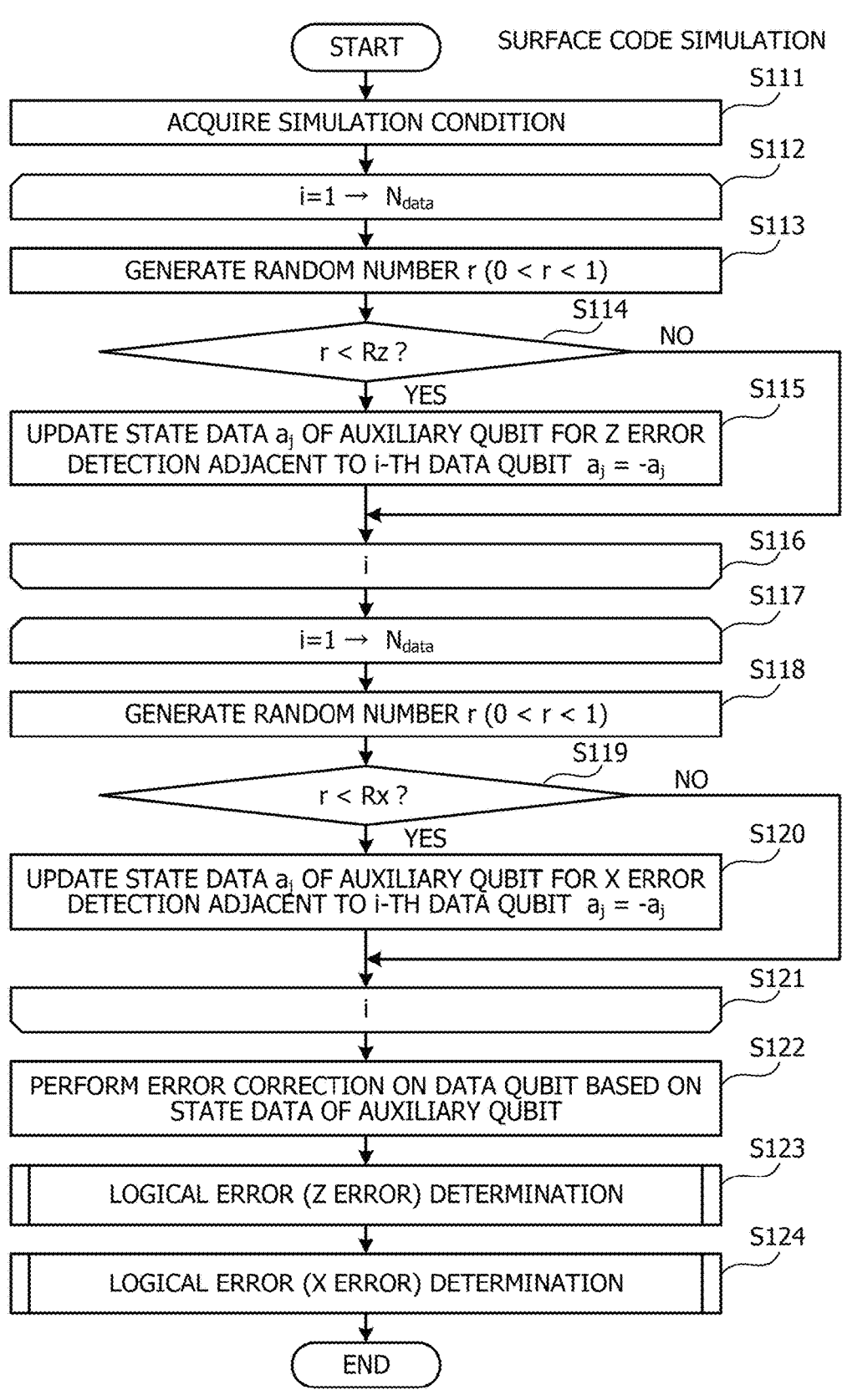
FIG. 25 is a flowchart illustrating an example of a procedure of processing of the surface code simulation.

FIG. 25 is a flowchart illustrating an example of a procedure of the processing of the surface code simulation. Hereinafter, the processing illustrated in FIG. 25 will be described along step numbers.

[Step S111] The surface code simulation management unit 120 acquires the simulation condition 111 from the storage unit 110. Based on the acquired simulation condition 111, the surface code simulation management unit 120 generates qubit information indicating a two-dimensional lattice in which qubits are arranged at equal intervals in a row direction and a column direction in a rectangular region. The qubit information includes state data indicating the quantum state for each qubit. The surface code simulation management unit 120 transmits the generated qubit information to the error occurrence state generation unit 130, and instructs generation of an error occurrence state for the data qubits in the two-dimensional lattice.

[Step S112] The error occurrence state generation unit 130 executes processing of steps S113 to S115 for each value of i until a variable i reaches $N_{data}$ by counting up the variable i by 1 in order from 1.

[Step S113] The error occurrence state generation unit 130 generates a random number r greater than 0 and less than 1.

[Step S114] The error occurrence state generation unit 130 determines whether or not a value of the random number r is smaller than Rz indicating a Z error rate. When the value of the random number r is smaller than Rz, the error occurrence state generation unit 130 advances the processing to step S115. Furthermore, when the value of the random number r is equal to or greater than Rz, the error occurrence state generation unit 130 advances the processing to step S116.

[Step S115] The error occurrence state generation unit 130 inverts a phase of a state of an i-th data qubit. Furthermore, the error occurrence state generation unit 130 updates a value of state data ($a_j$ in the case of a j-th auxiliary qubit) of an auxiliary qubit for Z error detection adjacent to the data qubit whose phase is inverted ($a_j$=−$a_j$).

[Step S116] When the value of the variable i has reached $N_{data}$, the error occurrence state generation unit 130 advances the processing to step S117.

[Step S117] The error occurrence state generation unit 130 executes processing of steps S118 to S121 for each value of i until the variable i reaches $N_{data}$ by counting up the variable i by 1 in order from 1.

[Step S118] The error occurrence state generation unit 130 generates a random number r greater than 0 and less than 1.

[Step S119] The error occurrence state generation unit 130 determines whether or not a value of the random number r is smaller than Rx indicating an X error rate. When the value of the random number r is smaller than Rx, the error occurrence state generation unit 130 advances the processing to step S120. Furthermore, when the value of the random number r is equal to or greater than Rx, the error occurrence state generation unit 130 advances the processing to step S121.

[Step S120] The error occurrence state generation unit 130 inverts a bit of the i-th data qubit. Furthermore, the error occurrence state generation unit 130 updates a value of state data ($a_j$ in the case of the j-th auxiliary qubit) of an auxiliary qubit for X error detection adjacent to the data qubit whose bit is inverted ($a_j = -a_j$).

[Step S121] When the value of the variable i has reached $N_{data}$, the error occurrence state generation unit 130 advances the processing to step S122.

[Step S122] The error correction unit 140 performs error correction processing on the data qubit based on the state data of the auxiliary qubit. For example, the error correction unit 140 specifies a data qubit in which a Z error or an X error has occurred as illustrated in FIG. 14 based on the data qubit whose value is inverted. Then, the error correction unit 140 performs, on the data qubit in which it is estimated that an error has occurred, the error correction processing according to the error that has occurred. For example, the error correction unit 140 inverts a phase of a data qubit in which it is estimated that a Z error has occurred, and inverts a bit of a data qubit in which it is estimated that an X error has occurred.

[Step S123] The logical error determination unit 150 performs logical error (Z error) determination processing based on the number of inverted qubits of one column. Details of this processing will be described later (see FIG. 26).

[Step S124] The logical error determination unit 150 performs logical error (X error) determination processing based on the number of inverted qubits of one row. Details of this processing will be described later (see FIG. 27).

In this way, presence or absence of occurrence of a logical error in a case where an error has been randomly generated in a data qubit is determined. Next, the logical error determination processing based on the number of inverted qubits will be described in detail with reference to FIGS. 26 and 27.

Figure 26:
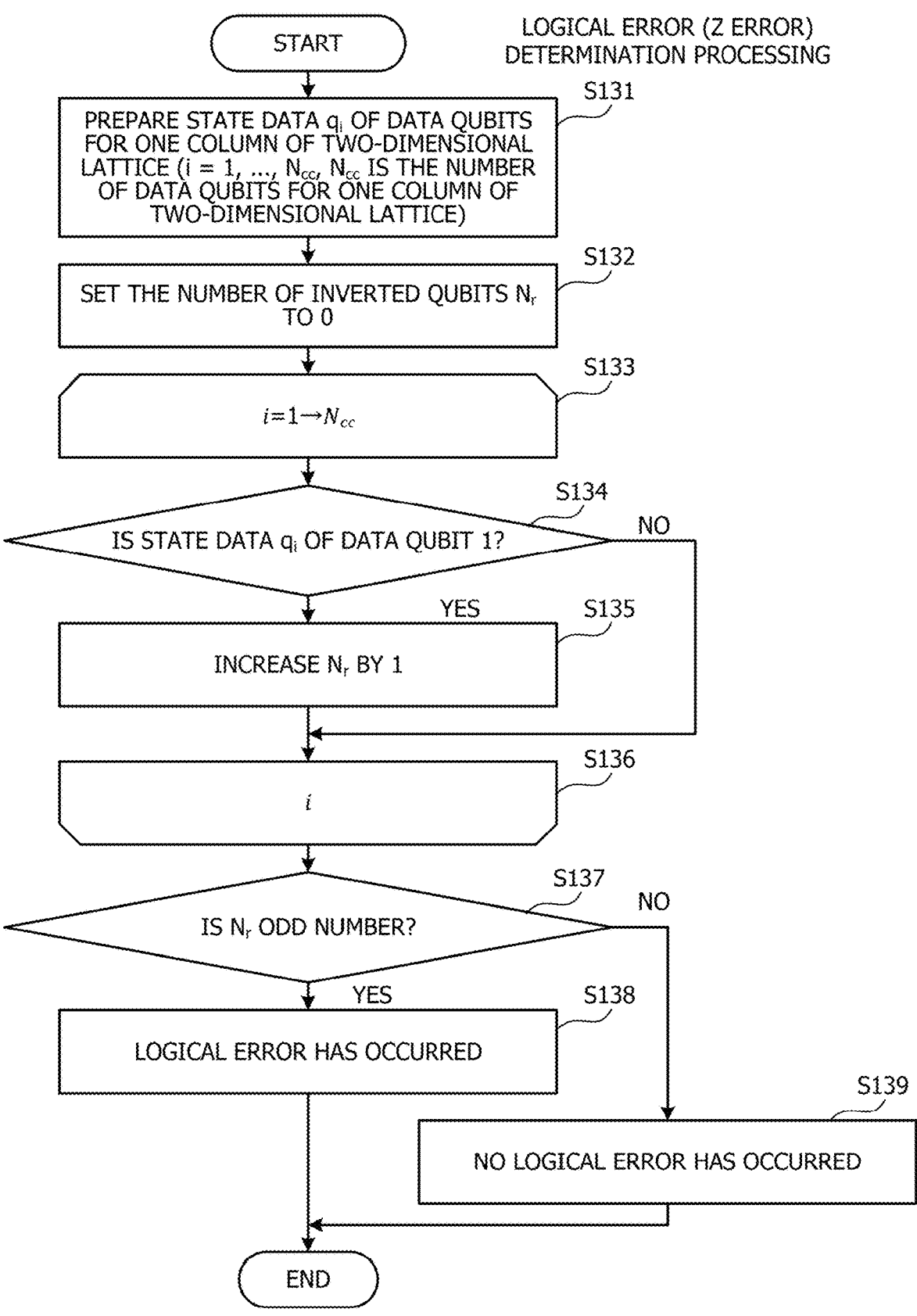
FIG. 26 is a flowchart illustrating an example of a procedure of logical error (Z error) determination processing.

FIG. 26 is a flowchart illustrating an example of a procedure of the logical error (Z error) determination processing. Hereinafter, the processing illustrated in FIG. 26 will be described along step numbers.

[Step S131] The logical error determination unit 150 prepares state data $q_i(i=1, \ldots, N_{cc})$ of data qubits for one column (investigation target column) of the two-dimensional lattice. $N_{cc}$ is the number of data qubits for one column of the two-dimensional lattice.

[Step S132] The logical error determination unit 150 sets the number of inverted qubits Nr to an initial value "0".

[Step S133] The logical error determination unit 150 executes processing of steps S134 and S135 for each value of i until the variable i reaches $N_{cc}$ by counting up the variable i by 1 in order from 1.

[Step S134] The logical error determination unit 150 determines whether or not a value of the state data $q_i$ indicating presence or absence of phase inversion of the i-th data qubit is "1". When the value is "1", the logical error determination unit 150 advances the processing to step S135. Furthermore, when the value is "0", the logical error determination unit 150 advances the processing to step S136.

[Step S135] The logical error determination unit 150 adds "1" to the number of inverted qubits $N_r$.

[Step S136] When the value of the variable i has reached $N_{cc}$, the logical error determination unit 150 advances the processing to step S137.

[Step S137] The logical error determination unit 150 determines whether or not the number of inverted qubits $N_r$ is an odd number. In the case of an odd number, the logical error determination unit 150 advances the processing to step S138. Furthermore, in the case of an even number, the logical error determination unit 150 advances the processing to step S139.

[Step S138] The logical error determination unit 150 determines that a logical error has occurred, and ends the logical error determination processing.

[Step S139] The logical error determination unit 150 determines that no logical error has occurred.

The above processing is the logical error determination processing for a Z error. Next, the logical error determination processing for an X error will be described in detail.

FIG. 27 is a flowchart illustrating an example of a procedure of the logical error (X error) determination processing. Hereinafter, the processing illustrated in FIG. 27 will be described along step numbers.

[Step S141] The logical error determination unit 150 prepares state data $q_i$ ($i=1, \ldots, N_{cr}$) of data qubits for one row (investigation target row) of the two-dimensional lattice. Nor is the number of data qubits for one row of the two-dimensional lattice.

[Step S142] The logical error determination unit 150 sets the number of inverted qubits $N_r$ to an initial value "0".

[Step S143] The logical error determination unit 150 executes processing of steps S144 and S145 for each value of i until the variable i reaches Nor by counting up the variable i by 1 in order from 1.

[Step S144] The logical error determination unit 150 determines whether or not a value of the state data $q_i$ indicating presence or absence of bit inversion of the i-th data qubit is "1". When the value is "1", the logical error determination unit 150 advances the processing to step S145. Furthermore, when the value is "0", the logical error determination unit 150 advances the processing to step S146.

[Step S145] The logical error determination unit 150 adds "1" to the number of inverted qubits $N_r$.

[Step S146] When the value of the variable i has reached $N_{cr}$, the logical error determination unit 150 advances the processing to step S147.

[Step S147] The logical error determination unit 150 determines whether or not the number of inverted qubits $N_r$ is an odd number. In the case of an odd number, the logical error determination unit 150 advances the processing to step S148. Furthermore, in the case of an even number, the logical error determination unit 150 advances the processing to step S149.

[Step S148] The logical error determination unit 150 determines that a logical error has occurred, and ends the logical error determination processing.

[Step S149] The logical error determination unit 150 determines that no logical error has occurred.

The above processing is the logical error determination processing for an X error.

As described above, the logical error determination unit 150 may determine presence or absence of a logical error only by investigating values of data qubits for one column or one row of a two-dimensional lattice. As a result, efficient logical error determination may be performed.

Figure 28:
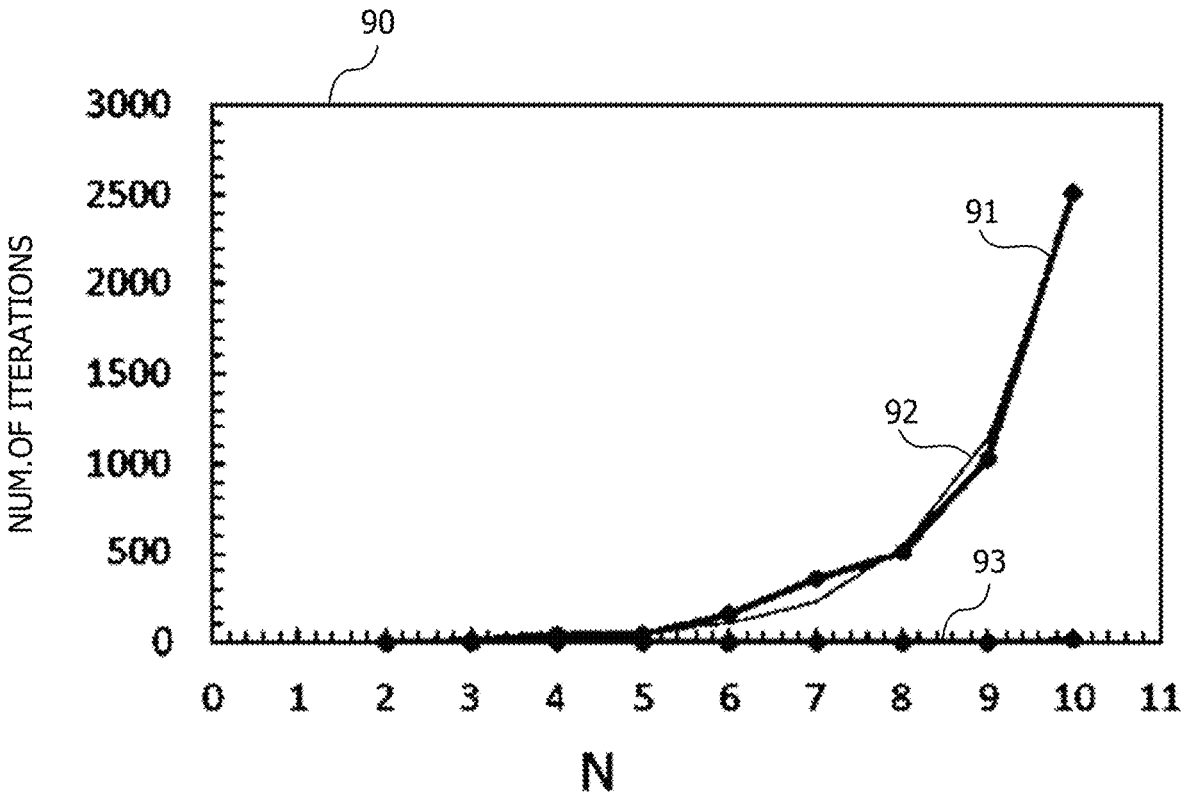
FIG. 28 is a graph illustrating a relationship between the number of data qubits of one side of the two-dimensional lattice and the number of searches.

FIG. 28 is a graph illustrating a relationship between the number of data qubits of one side of a two-dimensional lattice and the number of searches. In a graph 90, a horizontal axis represents the number of data qubits N of the one side of the two-dimensional lattice, and a vertical axis represents the number of searches. The number of searches is counted as once every time a state of one data qubit is confirmed. A polygonal line 91 in the graph 90 is a polygonal line indicating the number of searches in a case where logical error determination by a search of an error chain as illustrated in FIG. 18 is performed. An approximate curve 92 is an approximate curve for the polygonal line 91 in a case where the logical error determination by the search of the error chain is performed. The approximate curve 92 is an exponential function of $y=2^{1.13x}$ in a case where it is assumed that the horizontal axis is x and the vertical axis is y. A polygonal line 93 is a polygonal line indicating the number of searches in a case where logical error determination by the number of inverted qubits of one column (or one row) of the two-dimensional lattice is performed. The polygonal line 93 may be represented by a straight line of y=x+1 in a case where it is assumed that the horizontal axis is x and the vertical axis is y.

In the example of FIG. 28, the number of searches in each logical error determination at the number of data qubits N=2 to 10 of one side is illustrated. An error probability in the simulation condition is 20%. As illustrated in FIG. 28, in the search of the error chain, the number of searches increases exponentially for N, whereas in the logical error determination based on the number of inverted qubits, the number of searches increases with a linear function of N.

As described above, it is possible to determine whether a logical error has occurred in a short time by the logical error determination based on the number of inverted qubits. In other words, when it is assumed that the number of data qubits of one side of the two-dimensional lattice is N, the number of searches may be reduced from an exponential function of N to a linear function. For example, in the case of 40 qubits, when processing is performed in an error chain by a processor having a clock frequency of 1 GHZ, a processing time is $2^{1.13\times40}\times10^{-9}/3600=11.26$ (h), and it takes about half a day. On the other hand, in the logical error determination based on the number of inverted qubits, the processing time is shortened to 40+1=41 (nsec).

OTHER EMBODIMENTS

In the second embodiment, the logical qubit is configured by the qubits arranged in a two-dimensional lattice pattern of five rows and 11 columns, but even when the number of rows or the number of columns is changed, a logical error may be determined by similar processing.

The above description merely indicates a principle of the present invention. Moreover, numerous modifications and variations may be made by those skilled in the art, and the present invention is not limited to the above-described or illustrated exact configuration and application example, and all corresponding modifications and equivalents are regarded to fall within the scope of the present invention by appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a simulation program of performing a simulation of surface code-based quantum error correction in a quantum computer by utilizing a classical computer, the simulation program comprising instructions which, when executed by a processor of the classical computer, cause the processor to execute processing comprising:

generating qubit information that indicates a two-dimensional lattice in which a plurality of data qubits and a plurality of auxiliary qubits are alternately arranged in each of a row direction and a column direction;

setting, for the qubit information, error information that indicates error occurrence in a first data qubit among the plurality of data qubits;

setting, for the qubit information, error detection information obtained by inverting, from an initial value, a state of an auxiliary qubit adjacent to the first data qubit in the row direction or the column direction;

setting, for the qubit information, error correction information that indicates a second data qubit to be subjected to error correction by a surface code based on the error detection information; and determining presence or absence of occurrence of a logical error, wherein the determining includes:

identifying, from among the plurality of data qubits in the two-dimensional lattice, a set of data qubits within a single row or a single column in the two-dimensional lattice, counting, within the identified set of data qubits, a number of inverted data qubits each of which corresponds to either the first data qubit or the second data qubit, but not both, and determining that a logical error has occurred when the counted number of inverted data qubits is an odd number.

2. The non-transitory computer-readable recording medium according to claim 1, wherein, the generating of the qubit information includes generating the qubit information that indicates the two-dimensional lattice in which a column in which auxiliary qubits for phase inversion error detection are arranged and a column in which auxiliary qubits for bit inversion error detection are arranged are alternately provided, and the determining of the presence or absence of the occurrence of the logical error includes determining the presence or absence of the occurrence of the logical error caused by a phase inversion error, based on the data qubit number corresponding to the number obtained by counting the data qubits each of which corresponds to any one of the first data qubit or the second data qubit, each of the first data qubit and the second data qubit being a data qubit in one row or one column in a direction parallel to a boundary where the auxiliary qubits for bit inversion error detection are arranged among boundaries of four sides of the two-dimensional lattice.

3. The non-transitory computer-readable recording medium according to claim 1, wherein, the generating of the qubit information includes generating the qubit information that indicates the two-dimensional lattice in which a column in which auxiliary qubits for phase inversion error detection are arranged and a column in which auxiliary qubits for bit inversion error detection are arranged are alternately provided, and the determining of the presence or absence of the occurrence of the logical error includes determining the presence or absence of the occurrence of the logical error caused by a bit inversion error, based on the data qubit number corresponding to the number obtained by counting the data qubits each of which corresponds to any one of the first data qubit or the second data qubit in one row or one column in a direction parallel to a boundary where the auxiliary qubits for phase inversion error detection are arranged among boundaries of four sides of the two-dimensional lattice.

4. The non-transitory computer-readable recording medium according to claim 1, wherein, the setting of the error information includes randomly determining the first data qubit, which generates an error, from among the plurality of data qubits based on a predetermined error occurrence rate, and the setting of the error information, the setting of the error detection information, the setting of the error correction information, and the determination of the presence or absence of the occurrence of the logical error are repeatedly executed a predetermined number of times.

5. The non-transitory computer-readable recording medium according to claim 4, the processing further including calculating a logical error occurrence rate based on a result of the determining of the presence or absence of the occurrence of the logical error the predetermined number of times.

6. A simulation method implemented by a computer of performing a simulation of surface code-based quantum error correction in a quantum computer by utilizing the computer being a classical computer, the simulation method comprising:

generating qubit information that indicates a two-dimensional lattice in which a plurality of data qubits and a plurality of auxiliary qubits are alternately arranged in each of a row direction and a column direction;

setting, for the qubit information, error information that indicates error occurrence in a first data qubit among the plurality of data qubits;

setting, for the qubit information, error detection information obtained by inverting, from an initial value, a state of an auxiliary qubit adjacent to the first data qubit in the row direction or the column direction;

setting, for the qubit information, error correction information that indicates a second data qubit to be subjected to error correction by a surface code based on the error detection information; and determining presence or absence of occurrence of a logical error, wherein the determining includes:

identifying, from among the plurality of data qubits in the two-dimensional lattice, a set of data qubits within a single row or a single column in the two-dimensional lattice, counting, within the identified set of data qubits, a number of inverted data qubits each of which corresponds to either the first data qubit or the second data qubit, but not both, and determining that a logical error has occurred when the counted number of inverted data qubits is an odd number.

7. An information processing apparatus of performing a simulation of surface code-based quantum error correction in a quantum computer by utilizing the information processing apparatus being a classical computer, the information processing apparatus comprising:

a memory; and a processor coupled to the memory, the processor being configured to perform processing including:

generating qubit information that indicates a two-dimensional lattice in which a plurality of data qubits and a plurality of auxiliary qubits are alternately arranged in each of a row direction and a column direction;

setting, for the qubit information, error information that indicates error occurrence in a first data qubit among the plurality of data qubits;

setting, for the qubit information, error detection information obtained by inverting, from an initial value, a state of an auxiliary qubit adjacent to the first data qubit in the row direction or the column direction;

setting, for the qubit information, error correction information that indicates a second data qubit to be subjected to error correction by a surface code based on the error detection information; and determining presence or absence of occurrence of a logical error, wherein the determining includes:

identifying, from among the plurality of data qubits in the two-dimensional lattice, a set of data qubits within a single row or a single column in the two-dimensional lattice, counting, within the identified set of data qubits, a number of inverted data qubits each of which corresponds to either the first data qubit or the second data qubit, but not both, and determining that a logical error has occurred when the counted number of inverted data qubits is an odd number.

* * * * *